United States Patent
Kim et al.

(10) Patent No.: US 10,284,864 B2
(45) Date of Patent: May 7, 2019

(54) CONTENT INITIALIZATION FOR ENHANCEMENT LAYER CODING

(71) Applicant: Sharp Laboratories of America, Inc., Camas, WA (US)

(72) Inventors: Seung-Hwan Kim, Vancouver, WA (US); Christopher A. Segall, Vancouver, WA (US); Jie Zhao, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 15/603,155

(22) Filed: May 23, 2017

(65) Prior Publication Data

US 2017/0324969 A1    Nov. 9, 2017

Related U.S. Application Data

(63) Continuation of application No. 13/631,786, filed on Sep. 28, 2012, now abandoned.

(51) Int. Cl.
*H04N 19/436* (2014.01)
*H04N 19/129* (2014.01)
*H04N 19/30* (2014.01)
*H04N 19/91* (2014.01)

(52) U.S. Cl.
CPC ......... *H04N 19/436* (2014.11); *H04N 19/129* (2014.11); *H04N 19/30* (2014.11); *H04N 19/91* (2014.11)

(58) Field of Classification Search
CPC .................................................. H04N 19/436
See application file for complete search history.

(56) References Cited

U.S. PATENT DOCUMENTS

| | | | |
|---|---|---|---|
| 2006/0232454 A1* | 10/2006 | Cha | H04N 19/13 341/51 |
| 2010/0046626 A1* | 2/2010 | Tu | H04N 19/176 375/240.18 |
| 2012/0121017 A1* | 5/2012 | Chen | H04N 19/159 375/240.15 |
| 2012/0163453 A1 | 6/2012 | Horowitz | |
| 2013/0101035 A1* | 4/2013 | Wang | H04N 19/70 375/240.12 |

OTHER PUBLICATIONS

Schwarz, Heiko, Detlev Marpe, and Thomas Wiegand. "Overview of the scalable video coding extension of the H. 264/AVC standard." Circuits and Systems for Video Technology, IEEE Transactions on 17.9 (2007): 1103-1120.*
Bleszak, Łukasz. Advanced Scalable Hybrid Video Coding. Diss. Doctoral Thesis, Poznań University of Technology, Poznań, 2006.*
Blaszak, Advanced Scalable Hybrid Video Coding; Diss. Doctoral Thesis, Poznan University of Technology, Poznan, 2006, Part 1, 50 pgs.

(Continued)

*Primary Examiner* — James M Pontius
(74) *Attorney, Agent, or Firm* — Chernoff Vilhauer McClung & Stenzel, LLP

(57) ABSTRACT

A system for decoding a video bitstream includes receiving a frame of the video that includes at least one slice and at least one tile and where each of the at least one slice and the at least one tile are not all aligned with one another.

19 Claims, 34 Drawing Sheets

(56) References Cited

OTHER PUBLICATIONS

Blaszak, Advanced Scalable Hybrid Video Coding; Diss. Doctoral Thesis, Poznan University of Technology, Poznan, 2006, Part 2, 50 pgs.
Blaszak, Advanced Scalable Hybrid Video Coding; Diss. Doctoral Thesis, Poznan University of Technology, Poznan, 2006, Part 3, 50 pgs.
Blaszak, Advanced Scalable Hybrid Video Coding; Diss. Doctoral Thesis, Poznan University of Technology, Poznan, 2006, Part 4, 31 pgs.
Bross et al., High efficiency video coding (HEVC) text specification draft 8, JCTTVC-J1003, 10th Meeting, Stockholm, SE, Jul. 11-20, 2012, Part 1, 50 pgs.
Bross et al., High efficiency video coding (HEVC) text specification draft 8, JCTTVC-J1003, 10th Meeting, Stockholm, SE, Jul. 11-20, 2012, Part 2, 50 pgs.
Bross et al., High efficiency video coding (HEVC) text specification draft 8, JCTTVC-J1003, 10th Meeting, Stockholm, SE, Jul. 11-20, 2012, Part 3, 50 pgs.
Bross et al., High efficiency video coding (HEVC) text specification draft 8, JCTTVC-J1003, 10th Meeting, Stockholm, SE, Jul. 11-20, 2012, Part 4, 50 pgs.
Bross et al., High efficiency video coding (HEVC) text specification draft 8, JCTTVC-J1003, 10th Meeting, Stockholm, SE, Jul. 11-20, 2012, Part 5, 50 pgs.
Bross et al., High efficiency video coding (HEVC) text specification draft 8, JCTTVC-J1003, 10th Meeting, Stockholm, SE, Jul. 11-20, 2012, Part 6, 50 pgs.
Boyce (Vidyo), VPS syntax for scalable and 3D extensions, JCTVC-J0576, Stockholm, Jul. 2012, 3 pgs.
Chen et al. (Qualcomm), AHG10: On video parameter set for HEVC extensions, JCTVC-J0124, Stockholm, Jul. 2012, 15 pgs.
Choi et al. (Samsung), On NAL Unit Header and Video Parameter Set Design, JCTVC-J0432, Stockholm, Jul. 2012, 3 pgs.
Hannuksela (Nokia), AHG10 Hooks for Scalable Coding: Video Parameter Set Design, JCTVC-J0075, Stockholm, Jul. 2012, 9 pgs.
Schwarz et al., Overview of the scalable video coding extension of the H. 264/AVC standard, Circuits and Systems for Video Technology, IEEE Transactions on 17.9 (2007): 1103-1120.
Skupin et al., AHG9/AHG10: Design of the video Parameter Set, JCTVC-J0257, Stockholm, Jul. 2012, 17 pgs.
Wang, BoG on high-level syntax for extension planning, JCTVC-J0574, Stockholm, Jul. 2012, 17 pgs.

* cited by examiner

| Group | InitValue | Slope |
|---|---|---|
| 1 | 0~15 | -45 |
| 2 | 16~31 | -40 |
| 3 | 32~47 | -35 |
| 4 | 48~63 | -30 |
| 5 | 64~79 | -25 |
| 6 | 80~95 | -20 |
| 7 | 96~111 | -15 |
| 8 | 112~127 | -10 |
| 9 | 128~143 | -5 |
| 10 | 144~159 | 0 |
| 11 | 160~175 | 5 |
| 12 | 176~191 | 10 |
| 13 | 192~207 | 15 |
| 14 | 208~223 | 20 |
| 15 | 224~239 | 25 |
| 16 | 240~255 | 30 |

| Group | offset |
|---|---|
| 1 | -16 |
| 2 | -8 |
| 3 | 0 |
| 4 | 8 |
| 5 | 16 |
| 6 | 24 |
| 7 | 32 |
| 8 | 40 |
| 9 | 48 |
| 10 | 56 |
| 11 | 64 |
| 12 | 72 |
| 13 | 80 |
| 14 | 88 |
| 15 | 96 |
| 16 | 104 |

FIG. 18

| initState (764) | mpState (766) | State (770/772) | LPS probability (788) |
|---|---|---|---|
| 1 | 0 | 63 | 0.01875000 |
| 2 | 0 | 62 | 0.01975312 |
| 3 | 0 | 61 | 0.02080991 |
| 4 | 0 | 60 | 0.02192323 |
| 5 | 0 | 59 | 0.02309612 |
| 6 | 0 | 58 | 0.02433175 |
| 7 | 0 | 57 | 0.02563349 |
| 8 | 0 | 56 | 0.02700488 |
| ... | ... | ... | ... |
| 61 | 0 | 2 | 0.45050660 |
| 62 | 0 | 1 | 0.47460857 |
| 63 | 0 | 0 | 0.50000000 |
| 64 | 1 | 0 | 0.50000000 |
| 65 | 1 | 1 | 0.47460857 |
| ... | ... | ... | ... |
| 122 | 1 | 58 | 0.02433175 |
| 123 | 1 | 59 | 0.02309612 |
| 124 | 1 | 60 | 0.02192323 |
| 125 | 1 | 61 | 0.02080991 |
| 126 | 1 | 62 | 0.01975312 |

FIG. 19

Overall probability changes based on Delta QP and QP variation

| Picture type | Base Layer | Enhancement Layer |
|---|---|---|
| I | 0 | 0 |
| P | 1 | 1 or 2 (based on a flag) |
| B | 2 | 1 or 2 (based on a flag) |

FIG. 31

| Picture type | Base Layer | Enhancement Layer |
|---|---|---|
| I | 0 | 3 |
| P | 1 | 4 or 5 (based on a flag) |
| B | 2 | 4 or 5 (based on a flag) |

FIG. 32

CONTENT INITIALIZATION FOR ENHANCEMENT LAYER CODING

CROSS-REFERENCE TO RELATED APPLICATIONS

This application is a continuation of U.S. patent application Ser. No. 13/631,786, filed Sep. 28, 2012.

BACKGROUND OF THE INVENTION

The present invention relates to video encoding and decoding.

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and/or displaying digital media. For example, portable electronic devices now allow for digital media to be produced and/or consumed at almost any location where a consumer may be. Furthermore, some electronic devices may provide download or streaming of digital media content for the use and enjoyment of a consumer.

Digital video is typically represented as a series of images or frames, each of which contains an array of pixels. Each pixel includes information, such as intensity and/or color information. In many cases, each pixel is represented as a set of three colors. Some video coding techniques provide higher coding efficiency at the expense of increasing complexity. Increasing image quality requirements and increasing image resolution requirements for video coding techniques also increase the coding complexity.

The increasing popularity of digital media has presented several problems. For example, efficiently representing high-quality digital media for storage, transmittal, and playback presents several challenges. Techniques that represent digital media more efficiently is beneficial.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 7 illustrates a frame with a slice and 9 tiles.

FIG. 8 illustrates a frame with three slices and 3 tiles.

FIG. 18 illustrates slope and offset tables.

FIG. 19 illustrates a probability table.

FIG. 31 illustrates one technique for signaling of initialization tables.

FIG. 32 illustrates another technique for signaling of initialization tables.

DETAILED DESCRIPTION OF PREFERRED EMBODIMENT

Figure 1:
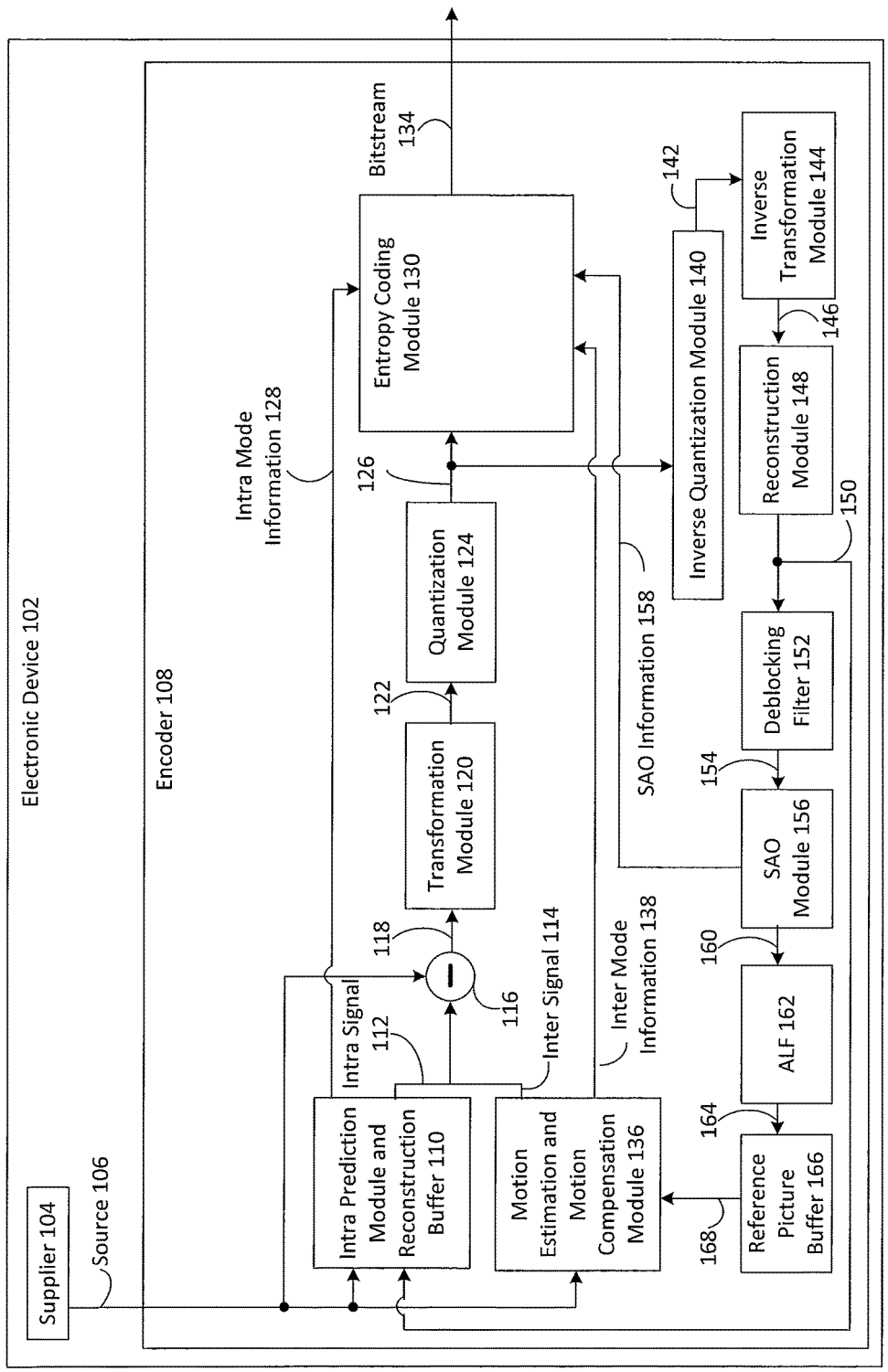
FIG. 1 is a block diagram illustrating one configuration of an electronic device including a HEVC encoder.

The Joint Collaborative Team on Video Coding (JCT-VC) of the International Telecommunication Union Telecommunication Standardization Sector (ITU-T) Study Group 16 (SG16) Working Party 3 (WP3) and International Organization for Standardization/International Electrotechnical Commission (ISO/IEC) Joint Technical Committee 1/Subcommittee 29/Working Group 11 (JTC1/SC29/WG11) has launched a standardization effort for a video coding standard called the High Efficiency Video Coding standard (HEVC). HEVC uses block-based coding.

In HEVC, an entropy coding technique Context-Adaptive Binary Arithmetic Coding CABAC)) is used to compress Transformed and Quantized Coefficients (TQCs) without loss. TQCs may be from different block sizes according to transform sizes (e.g., 4×4, 8×8, 16×16, 32×32).

Two-dimensional (2D) TQCs may be converted into a one-dimensional (1D) array before entropy coding. In one example, 2D arrayed TQCs in a 4×4 block may be arranged as illustrated in Table (1).

TABLE (1)

| 4 | 0 | 1 | 0 |
|---|---|---|---|
| 3 | 2 | −1 | ... |

TABLE (1)-continued

| -3 | 0 | ... | ... |
|---|---|---|---|
| 0 | ... | ... | ... |

When converting the 2D TQCs into a 1D array, the block may be scanned in a diagonal zig-zag fashion. Continuing with the example, the 2D arrayed TQCs illustrated in Table (1) may be converted into 1D arrayed TQCs [4, 0, 3, −3, 2, 1, 0, −1, 0, . . . ] by scanning the first row and first column, first row and second column, second row and first column, third row and first column, second row and second column, first row and third column, first row and fourth column, second row and third column, third row and second column, fourth row and first column and so on.

The coding procedure in HEVC may proceed, for example, as follows. The TQCs in the 1D array may be ordered according to scanning position. The scanning position of the last significant coefficient and the last coefficient level may be determined. The last significant coefficient may be coded. It should be noted that coefficients are typically coded in reverse scanning order. Run-level coding may be performed, which encodes information about runs of identical numbers and/or bits rather than encoding the numbers themselves, which is activated directly after the last coefficient coding. Then, level coding may be performed. The term significant coefficient refers to a coefficient that has a coefficient level value that is greater than zero. A coefficient level value refers to a unique indicator of the magnitude (or absolute value) of a Transformed and Quantized Coefficient (TQC) value.

This procedure may be illustrated in Table (2) as a continuation of the example above (with the 1D arrayed TQCs [4, 0, 3, −3, 2, 1, 0, −1, 0, . . . ]).

TABLE (2)

| | Scanning Position | | | | | | | | |
|---|---|---|---|---|---|---|---|---|---|
| | 0 | 1 | 2 | 3 | 4 | 5 | 6 | 7 | ... |
| | | | | Coefficient Level | | | | | |
| | 4 | 0 | 3 | −3 | 2 | 1 | 0 | −1 | ... |
| Last Position | | | | | | | | 7 | |
| Last Coefficient Level | | | | | | | | −1 | |
| Run-Level Coding | | | | | 2 | 1 | 0 | | |
| Level Coding | 4 | 0 | 3 | −3 | | | | | |

In Table (2), for example, the coefficient level −1 at scanning position 7 may be the last non-zero coefficient. Thus, the last position is scanning position 7 and the last coefficient level is −1. Run-level coding may be performed for coefficients 0, 1 and 2 at scanning positions 6, 5 and 4 (where coefficients are coded in reverse scanning order). Then, level coding may be performed for the coefficient levels −3, 3, 0 and 4.

FIG. 1 is a block diagram illustrating one configuration of an electronic device 102 in which video may be coded. It should be noted that one or more of the elements illustrated as included within the electronic device 102 may be implemented in hardware, software, or a combination of both. For example, the electronic device 102 includes a encoder 108, which may be implemented in hardware, software or a combination of both. For instance, the encoder 108 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 108 may be a high efficiency video coding (HEVC) coder.

The electronic device 102 may include a supplier 104. The supplier 104 may provide picture or image data (e.g., video) as a source 106 to the encoder 108. Examples of the supplier 104 include image sensors, memory, communication interfaces, network interfaces, wireless receivers, ports, etc.

The source 106 may be provided to an intra-frame prediction module and reconstruction buffer 110. The source 106 may also be provided to a motion estimation and motion compensation module 136 and to a subtraction module 116.

The intra-frame prediction module and reconstruction buffer 110 may generate intra mode information 128 and an intra signal 112 based on the source 106 and reconstructed data 150. The motion estimation and motion compensation module 136 may generate inter mode information 138 and an inter signal 114 based on the source 106 and a reference picture buffer 166 signal 168. The reference picture buffer 166 signal 168 may include data from one or more reference pictures stored in the reference picture buffer 166.

The encoder 108 may select between the intra signal 112 and the inter signal 114 in accordance with a mode. The intra signal 112 may be used in order to exploit spatial characteristics within a picture in an intra coding mode. The inter signal 114 may be used in order to exploit temporal characteristics between pictures in an inter coding mode. While in the intra coding mode, the intra signal 112 may be provided to the subtraction module 116 and the intra mode information 128 may be provided to an entropy coding module 130. While in the inter coding mode, the inter signal 114 may be provided to the subtraction module 116 and the inter mode information 138 may be provided to the entropy coding module 130.

Either the intra signal 112 or the inter signal 114 (depending on the mode) is subtracted from the source 106 at the subtraction module 116 in order to produce a prediction residual 118. The prediction residual 118 is provided to a transformation module 120. The transformation module 120 may compress the prediction residual 118 to produce a transformed signal 122 that is provided to a quantization module 124. The quantization module 124 quantizes the transformed signal 122 to produce transformed and quantized coefficients (TQCs) 126.

The TQCs 126 are provided to an entropy coding module 130 and an inverse quantization module 140. The inverse quantization module 140 performs inverse quantization on the TQCs 126 to produce an inverse quantized signal 142 that is provided to an inverse transformation module 144. The inverse transformation module 144 decompresses the inverse quantized signal 142 to produce a decompressed signal 146 that is provided to a reconstruction module 148.

The reconstruction module 148 may produce reconstructed data 150 based on the decompressed signal 146. For example, the reconstruction module 148 may reconstruct (modified) pictures. The reconstructed data 150 may be provided to a deblocking filter 152 and to the intra prediction module and reconstruction buffer 110. The deblocking filter 152 may produce a filtered signal 154 based on the reconstructed data 150.

The filtered signal 154 may be provided to a sample adaptive offset (SAO) module 156. The SAO module 156 may produce SAO information 158 that is provided to the entropy coding module 130 and an SAO signal 160 that is provided to an adaptive loop filter (ALF) 162. The ALF 162 produces an ALF signal 164 that is provided to the reference picture buffer 166. The ALF signal 164 may include data from one or more pictures that may be used as reference pictures. In some cases the ALF 162 may be omitted.

The entropy coding module 130 may code the TQCs 126 to produce a bitstream 134. As described above, the TQCs 126 may be converted to a 1D array before entropy coding. Also, the entropy coding module 130 may code the TQCs 126 using CAVLC or CABAC. In particular, the entropy coding module 130 may code the TQCs 126 based on one or more of intra mode information 128, inter mode information 138 and SAO information 158. The bitstream 134 may include coded picture data.

Quantization, involved in video compression such as HEVC, is a lossy compression technique achieved by compressing a range of values to a single quantum value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 102 (e.g., the encoder 108) may determine the QP, resolution information and block type, which may be provided to the entropy coding module 130.

The entropy coding module 130 may determine the block size based on a block of TQCs 126. For example, block size may be the number of TQCs 126 along one dimension of the block of TQCs. In other words, the number of TQCs 126 in the block of TQCs may be equal to block size squared. In addition, the block may be non-square where the number of TQCs 126 is the height times the width of the block. For instance, block size may be determined as the square root of the number of TQCs 126 in the block of TQCs. Resolution may be defined as a pixel width by a pixel height. Resolution information may include a number of pixels for the width of a picture, for the height of a picture or both. Block size may be defined as the number of TQCs along one dimension of a 2D block of TQCs.

In some configurations, the bitstream 134 may be transmitted to another electronic device. For example, the bitstream 134 may be provided to a communication interface, network interface, wireless transmitter, port, etc. For instance, the bitstream 134 may be transmitted to another electronic device via a Local Area Network (LAN), the Internet, a cellular phone base station, etc. The bitstream 134 may additionally or alternatively be stored in memory on the electronic device 102.

Figure 2:
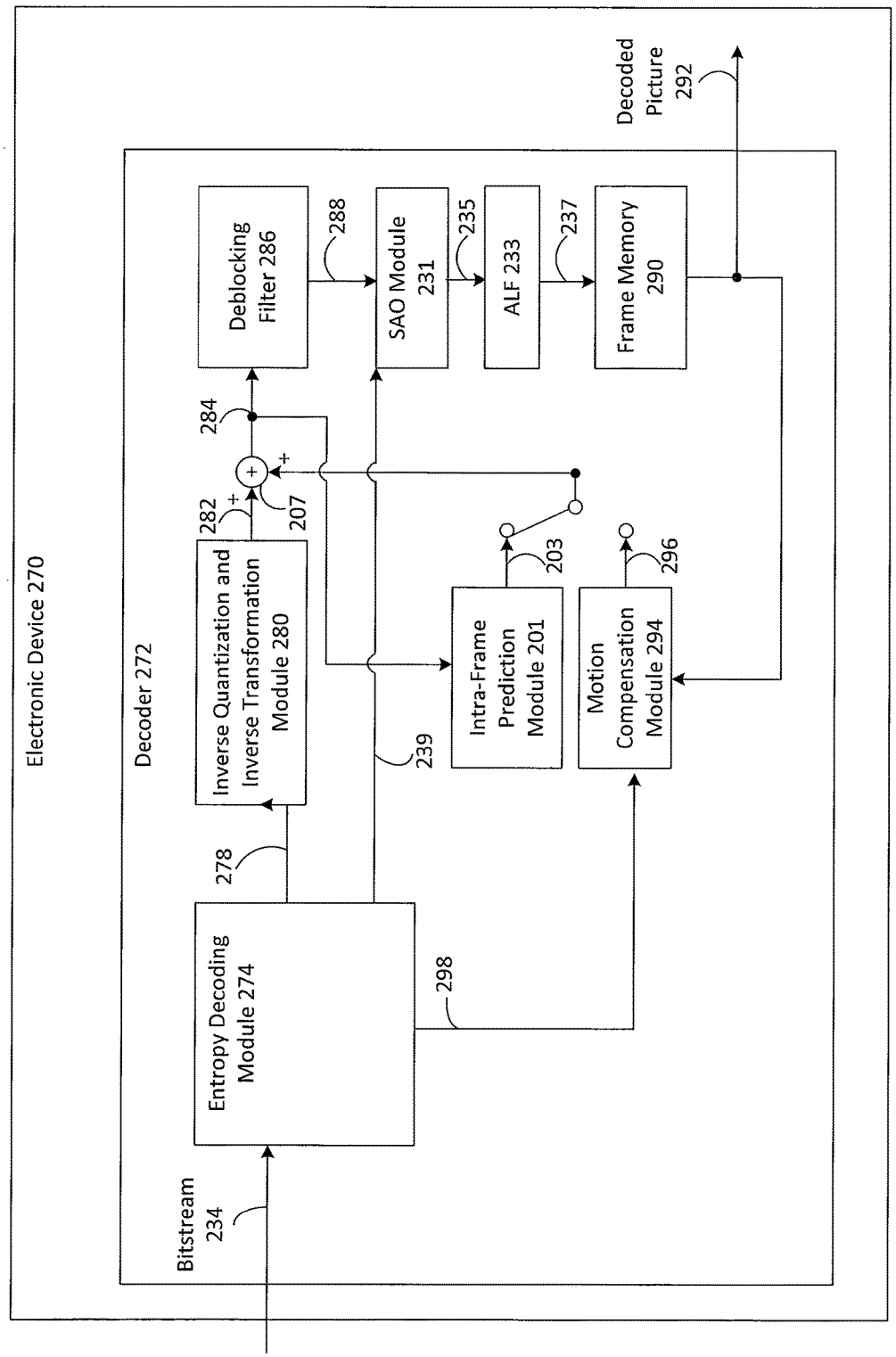
FIG. 2 is a block diagram illustrating one configuration of an electronic device including a HEVC decoder.

FIG. 2 is a block diagram illustrating one configuration of an electronic device 270 including a decoder 272 that may be a high-efficiency video coding (HEVC) decoder. The decoder 272 and one or more of the elements illustrated as included in the decoder 272 may be implemented in hardware, software or a combination of both. The decoder 272 may receive a bitstream 234 (e.g., one or more coded pictures included in the bitstream 234) for decoding. In some configurations, the received bitstream 234 may include received overhead information, such as a received slice header, received picture parameter set (PPS), received buffer description information, classification indicator, etc.

Received symbols (e.g., encoded TQCs) from the bitstream 234 may be entropy decoded by an entropy decoding module 274. This may produce a motion information signal 298 and decoded transformed and quantized coefficients (TQCs) 278.

The motion information signal 298 may be combined with a portion of a decoded picture 292 from a frame memory 290 at a motion compensation module 294, which may produce an inter-frame prediction signal 296. The decoded transformed and quantized coefficients (TQCs) 278 may be inverse quantized and inverse transformed by an inverse quantization and inverse transformation module 280, thereby producing a decoded residual signal 282. The decoded residual signal 282 may be added to a prediction signal 205 by a summation module 207 to produce a combined signal 284. The prediction signal 205 may be a signal selected from either the inter-frame prediction signal 296 produced by the motion compensation module 294 or an intra-frame prediction signal 203 produced by an intra-frame prediction module 201. In some configurations, this signal selection may be based on (e.g., controlled by) the bitstream 234.

The intra-frame prediction signal 203 may be predicted from previously decoded information from the combined signal 284 (in the current frame, for example). The combined signal 284 may also be filtered by a deblocking filter 286. The resulting filtered signal 288 may be provided to a sample adaptive offset (SAO) module 231. Based on the filtered signal 288 and information 239 from the entropy decoding module 274, the SAO module 231 may produce an SAO signal 235 that is provided to an adaptive loop filter (ALF) 233. The ALF 233 produces an ALF signal 237 that is provided to the frame memory 290. The ALF signal 237 may include data from one or more pictures that may be used as reference pictures. The ALF signal 237 may be written to frame memory 290. The resulting ALF signal 237 may include a decoded picture. In some cases the ALF 233 may be omitted.

The frame memory 290 may include a decoded picture buffer (DPB). The frame memory 290 may also include overhead information corresponding to the decoded pictures. For example, the frame memory 290 may include slice headers, picture parameter set (PPS) information, cycle parameters, buffer description information, etc. One or more of these pieces of information may be signaled from a coder (e.g., encoder 108).

The frame memory 290 may provide one or more decoded pictures 292 to the motion compensation module 294. Furthermore, the frame memory 290 may provide one or more decoded pictures 292, which may be output from the decoder 272. The one or more decoded pictures 292 may be presented on a display, stored in memory or transmitted to another device, for example.

Figure 3:
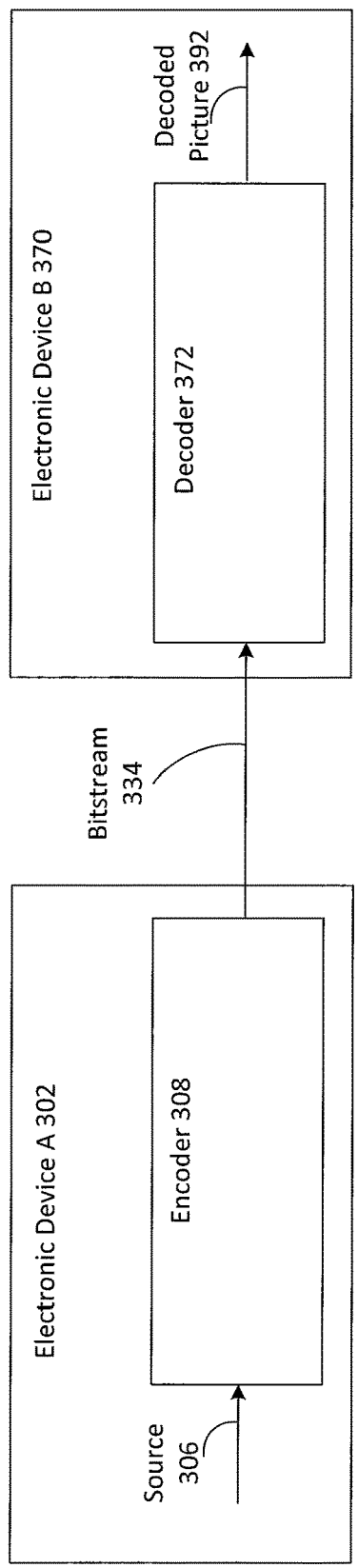
FIG. 3 is a block diagram illustrating one example of an encoder and a decoder.

FIG. 3 is a block diagram illustrating one example of an ecoder 308 and a decoder 372. In this example, electronic device A 302 and electronic device B 370 are illustrated. However, it should be noted that the features and functionality described in relation to electronic device A 302 and electronic device B 370 may be combined into a single electronic device in some configurations.

Electronic device A 302 includes the encoder 308. The encoder 308 may be implemented in hardware, software or a combination of both. In one configuration, the encoder 308 may be a high-efficiency video coding (HEVC) coder. Other coders may likewise be used. Electronic device A 302 may obtain a source 306. In some configurations, the source 306 may be captured on electronic device A 302 using an image sensor, retrieved from memory or received from another electronic device.

The encoder 308 may code the source 306 to produce a bitstream 334. For example, the encoder 308 may code a series of pictures (e.g., video) in the source 306. The encoder 308 may be similar to the encoder 108 described above in connection with FIG. 1.

The bitstream 334 may include coded picture data based on the source 306. In some configurations, the bitstream 334 may also include overhead data, such as slice header information, PPS information, etc. As additional pictures in the source 306 are coded, the bitstream 334 may include one or more coded pictures.

The bitstream 334 may be provided to the decoder 372. In one example, the bitstream 334 may be transmitted to electronic device B 370 using a wired or wireless link. In some cases, this may be done over a network, such as the Internet or a Local Area Network (LAN). As illustrated in FIG. 3, the decoder 372 may be implemented on electronic device B 370 separately from the encoder 308 on electronic device A 302. However, it should be noted that the encoder 308 and decoder 372 may be implemented on the same electronic device in some configurations. In an implementation where the encoder 308 and decoder 372 are implemented on the same electronic device, for instance, the bitstream 334 may be provided over a bus to the decoder 372 or stored in memory for retrieval by the decoder 372.

The decoder 372 may be implemented in hardware, software or a combination of both. In one configuration, the decoder 372 may be a high-efficiency video coding (HEVC) decoder. Other decoders may likewise be used. The decoder 372 may be similar to the decoder 272 described above in connection with FIG. 2.

Figure 4:
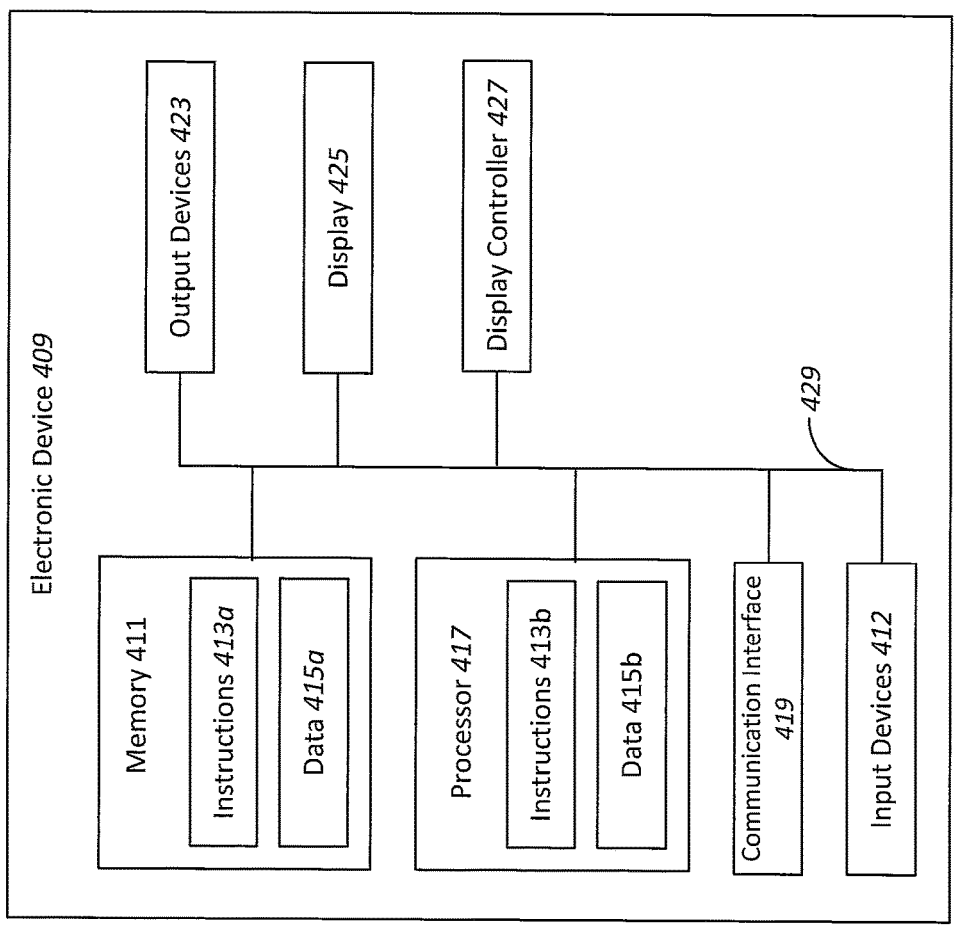
FIG. 4 illustrates various components that may be utilized in an electronic device.

FIG. 4 illustrates various components that may be utilized in an electronic device 409. The electronic device 409 may be implemented as one or more of the electronic devices. For example, the electronic device 409 may be implemented as the electronic device 102 described above in connection with FIG. 1, as the electronic device 270 described above in connection with FIG. 2, or both.

The electronic device 409 includes a processor 417 that controls operation of the electronic device 409. The processor 417 may also be referred to as a CPU. Memory 411, which may include both read-only memory (ROM), random access memory (RAM) or any type of device that may store information, provides instructions 413a (e.g., executable instructions) and data 415a to the processor 417. A portion of the memory 411 may also include non-volatile random access memory (NVRAM). The memory 411 may be in electronic communication with the processor 417.

Instructions 413b and data 415b may also reside in the processor 417. Instructions 413b and/or data 415b loaded into the processor 417 may also include instructions 413a and/or data 415a from memory 411 that were loaded for execution or processing by the processor 417. The instructions 413b may be executed by the processor 417 to implement one or more techniques disclosed herein.

The electronic device 409 may include one or more communication interfaces 419 for communicating with other electronic devices. The communication interfaces 419 may be based on wired communication technology, wireless communication technology, or both. Examples of communication interfaces 419 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The electronic device 409 may include one or more output devices 423 and one or more input devices 421. Examples of output devices 423 include a speaker, printer, etc. One type of output device that may be included in an electronic device 409 is a display device 425. Display devices 425 used with configurations disclosed herein may utilize any suitable image projection technology, such as a cathode ray tube (CRT), liquid crystal display (LCD), light-emitting diode (LED), gas plasma, electroluminescence or the like. A display controller 427 may be provided for converting data stored in the memory 411 into text, graphics, and/or moving images (as appropriate) shown on the display 425. Examples of input devices 421 include a keyboard, mouse, microphone, remote control device, button, joystick, trackball, touchpad, touchscreen, lightpen, etc.

The various components of the electronic device 409 are coupled together by a bus system 429, which may include a power bus, a control signal bus and a status signal bus, in addition to a data bus. However, for the sake of clarity, the various buses are illustrated in FIG. 4 as the bus system 429. The electronic device 409 illustrated in FIG. 4 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. The code for the decoder and/or encoder may be stored on a computer readable medium.

An input picture comprising a plurality of coded tree blocks (e.g., generally referred to herein as blocks) may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and block reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. No intra prediction and motion-vector prediction is preferably allowed across the boundary of a slice. In contrast, de-blocking filtering may use information across slice boundaries.

Figure 5:
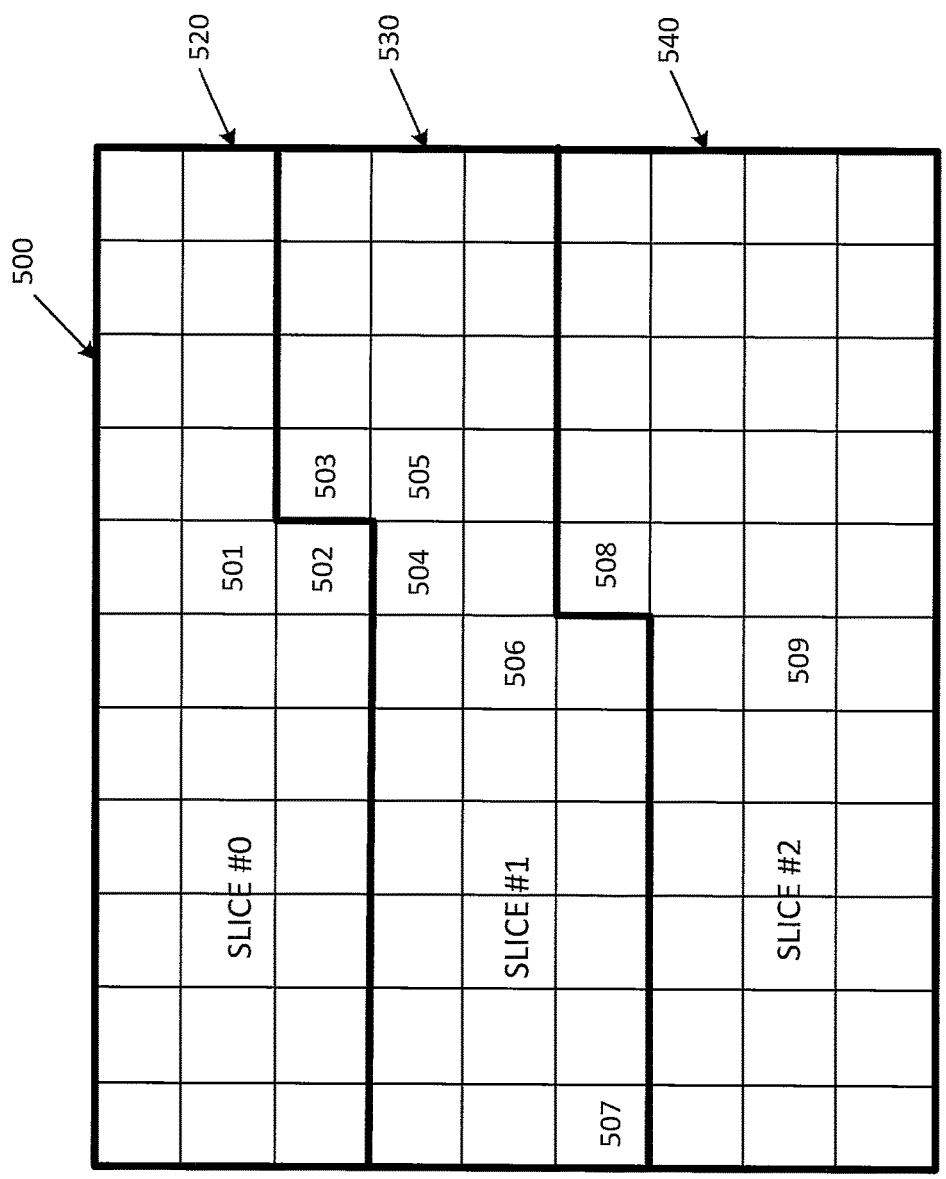
FIG. 5 illustrates an exemplary slice structure.

FIG. 5 illustrates an exemplary video picture 500 comprising eleven blocks in the horizontal direction and nine blocks in the vertical direction (nine exemplary blocks labeled 501-509). FIG. 5 illustrates three exemplary slices: a first slice denoted "SLICE #0" 520, a second slice denoted "SLICE #1" 530 and a third slice denoted "SLICE #2" 540. The decoder may decode and reconstruct the three slices 520, 530, 540, in parallel. Each of the slices may be transmitted in scan line order in a sequential manner. At the beginning of the decoding/reconstruction process for each slice, context models are initialized or reset and blocks in other slices are marked as unavailable for both entropy decoding and block reconstruction. The context model generally represents the state of the entropy encoder and/or decoder. Thus, for a block, for example, the block labeled 503, in "SLICE #1", blocks (for example, blocks labeled 501 and 502) in "SLICE #0" may not be used for context model selection or reconstruction. Whereas, for a block, for example, the block labeled 505, in "SLICE #1," other blocks (for example, blocks labeled 503 and 504) in "SLICE #1" may be used for context model selection or reconstruction. Therefore, entropy decoding and block reconstruction proceeds serially within a slice. Unless slices are defined using a flexible block ordering (FMO), blocks within a slice are processed in the order of a raster scan.

Figure 6:
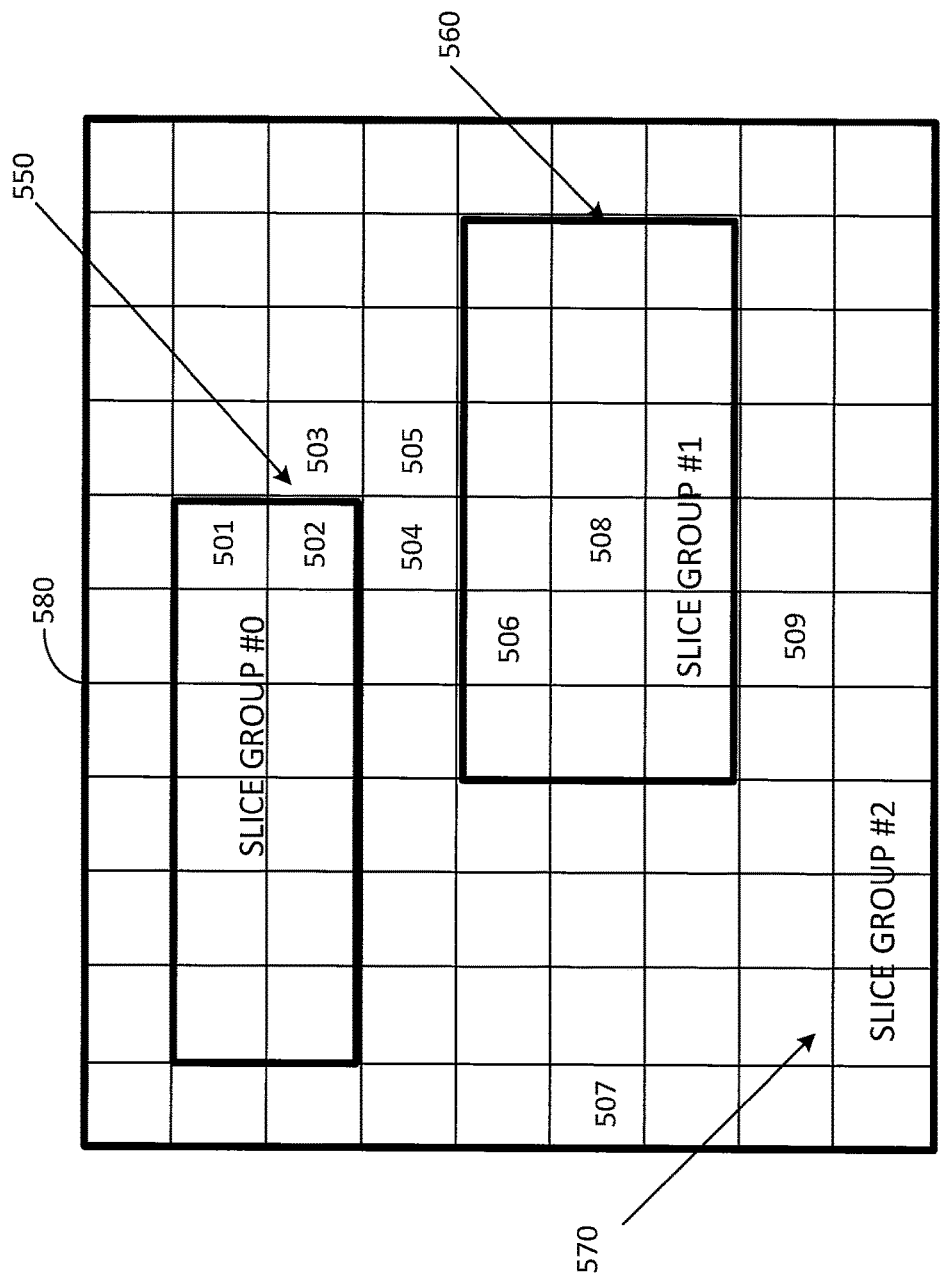
FIG. 6 illustrates another exemplary slice structure.

FIG. 6 depicts an exemplary block allocation into three slice groups: a first slice group denoted "SLICE GROUP #0" 550, a second slice group denoted "SLICE GROUP #1" 560 and a third slice group denoted "SLICE GROUP #2" 570. These slice groups 550, 560, 570, may be associated with two foreground regions and a background region, respectively, in the picture 580.

The arrangement of slices, as illustrated in FIG. 5, may be limited to defining each slice between a pair of blocks in the image scan order, also known as raster scan or a raster scan order. This arrangement of scan order slices is computationally efficient but does not tend to lend itself to the highly efficient parallel encoding and decoding. Moreover, this scan order definition of slices also does not tend to group smaller localized regions of the image together that are likely to have common characteristics highly suitable for coding efficiency. The arrangement of slices, as illustrated in FIG. 6, is highly flexible in its arrangement but does not tend to lend itself to high efficient parallel encoding or decoding. Moreover, this highly flexible definition of slices is computationally complex to implement in a decoder.

Figure 7:
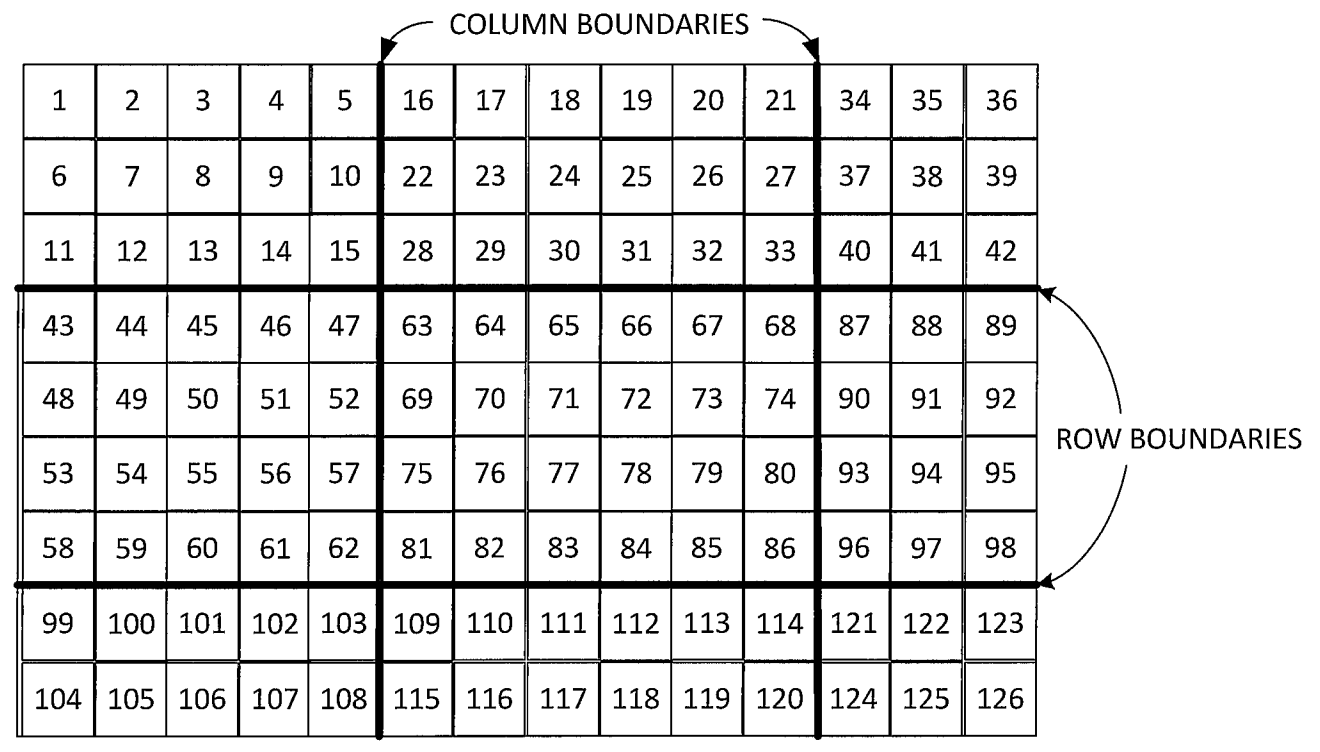

Referring to FIG. 7, a tile technique divides an image into a set of rectangular (inclusive of square) regions. The blocks (alternatively referred to as largest coding units or coded treeblocks in some systems) within each of the tiles are encoded and decoded in a raster scan order. The arrangement of tiles are likewise encoded and decoded in a raster scan order. Accordingly, there may be any suitable number of column boundaries (e.g., 0 or more) and there may be any suitable number of row boundaries (e.g., 0 or more). Thus, the frame may define one or more slices, such as the one slice illustrated in FIG. 7. In some embodiments, blocks located in different tiles are not available for intra-prediction, motion compensation, entropy coding context selection or other processes that rely on neighboring block information.

Figure 8:
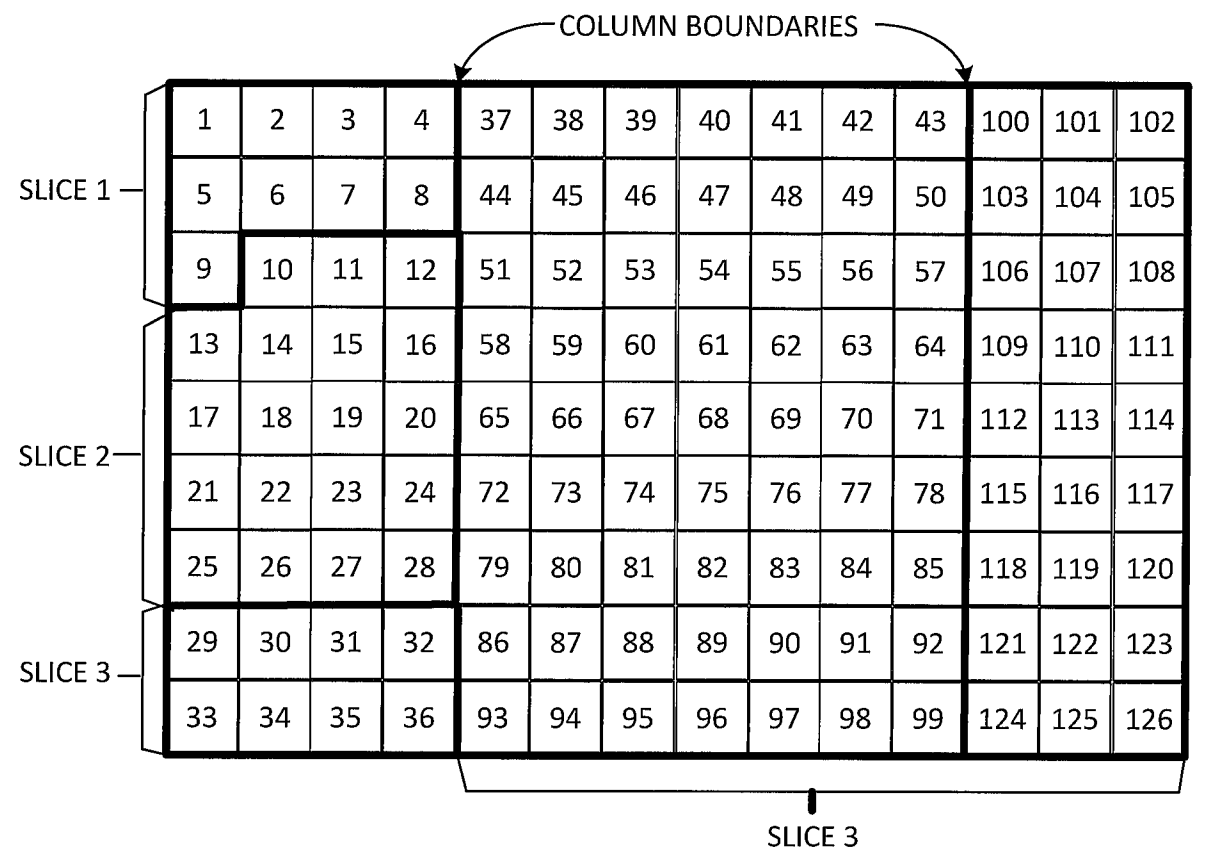

Referring to FIG. 8, the tile technique is shown dividing an image into a set of three rectangular columns. The blocks (alternatively referred to as largest coding units or coded treeblocks in some systems) within each of the tiles are encoded and decoded in a raster scan order. The tiles are likewise encoded and decoded in a raster scan order. One or more slices may be defined in the scan order of the tiles. Each of the slices are independently decodable. For example, slice 1 may be defined as including blocks 1-9, slice 2 may be defined as including blocks 10-28, and slice 3 may be defined as including blocks 29-126 which spans three tiles. The use of tiles facilitates coding efficiency by processing data in more localized regions of a frame.

It is to be understood that in some cases the video coding may optionally not include tiles, and may optionally include the use of a wavefront encoding/decoding pattern for the frames of the video. In this manner, one or more lines of the video (such as a plurality of groups of one or more rows of macroblocks (or alternatively coded tree blocks), each of which group being representative of a wavefront substrate may be encoded/decoded in a parallel fashion. In general, the partitioning of the video may be constructed in any suitable manner.

Video coding standards often compress video data for transmission over a channel with limited frequency bandwidth and/or limited storage capacity. These video coding standards may include multiple coding stages such as intra prediction, transform from spatial domain to frequency domain, quantization, entropy coding, motion estimation, and motion compensation, in order to more effectively encode and decode frames. Many of the coding and decoding stages are unduly computationally complex.

Figure 9:
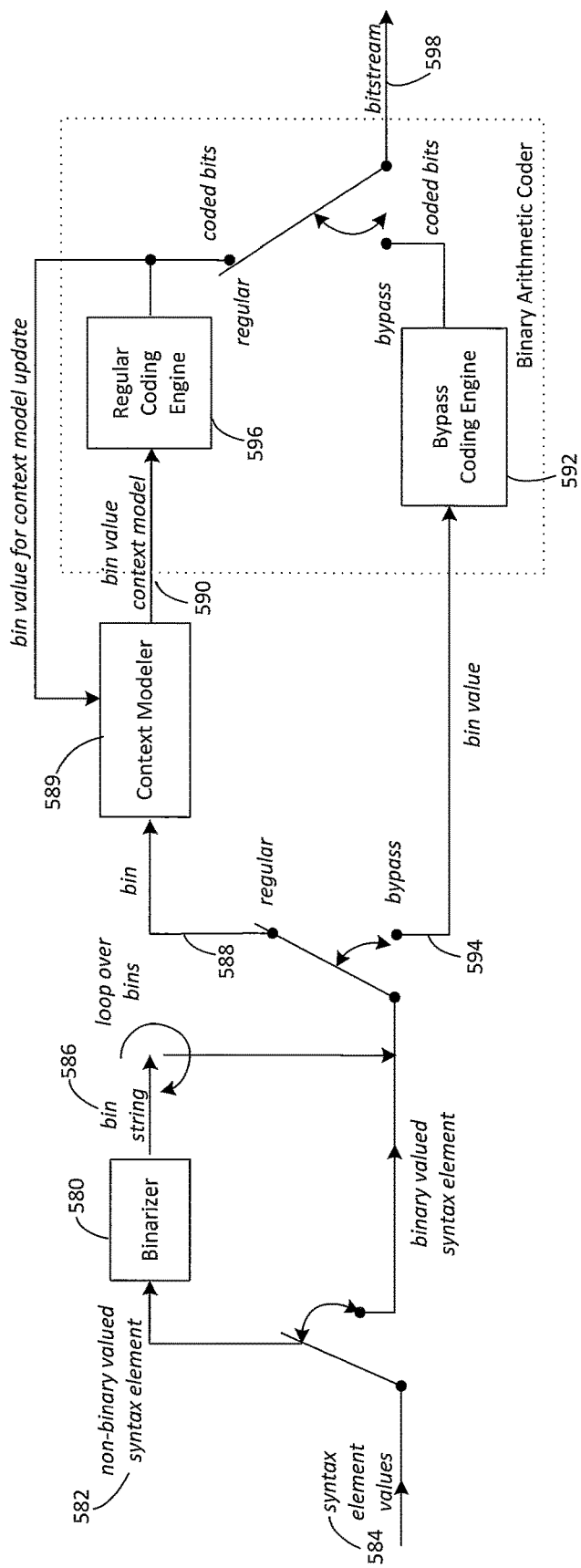
FIG. 9 illustrates a CABAC encoder.

Referring to FIG. 9, a context adaptive binary arithmetic coding (CABAC) based encoding and/or decoding technique is generally context adaptive which refers to (i) adaptively coding symbols based on the values of previous symbols encoded and/or decoded in the past, and (ii) context, which identifies the set of symbols encoded and/or decoded in the past use for adaptation. The past symbols may be located in spatial and/or temporal adjacent blocks. In many cases, the context is based upon symbol values of neighboring blocks. For example, a binarizer 580 is applied for non-binary valued syntax elements 582 to provide a unique mapping of syntax element values 584 to a sequence of binary decisions (bin string) 586. A regular (context based) coding mode 588 applies a probability estimation based on the given context model for a binary value 590 from a context modeler 589 using binary arithmetic coding in a regular coding engine 596. A bypass coding engine 592 of a bypass mode 594 does not use probability estimation and permits a speedup of the decoding process using a simplified coding engine with equal probability. The result is a bitstream 598 of regular and bypass coded data.

The context adaptive binary arithmetic coding (CABAC) encoding technique includes coding symbols using the following stages. In the first stage, the CABAC uses a "binarizer" to map input symbols to a string of binary symbols or "bins". The input symbol may be a non-binary valued symbol that is binarized or otherwise converted into a string of binary (1 or 0) symbols prior to being coded into bits. The bins can be coded into bits using either a "bypass encoding engine" or a "regular encoding engine". For the regular encoding engine in CABAC, in the second stage a probability model is selected. The probability model is used to arithmetic encode one or more bins of the binarized input symbols. This model may be selected from a list of available probability models depending on the context, which is a function of recently encoded symbols. The context model stores the probability of each bin being "1" or "0". In the third stage, an arithmetic encoder encodes each bin according to the selected probability model. There are two sub-ranges for each bin, corresponding to a "0" and a "1". The fourth stage involves updating the probability model. The selected probability model is updated based on the actual encoded bin value (e.g., if the bin value was a "1", the frequency count of the "1"s is increased). The decoding technique for CABAC decoding reverses the process.

For the bypass encoding engine in CABAC, the second stage involves conversion of bins to bits omitting the computationally expensive context estimation and probability update stages. The bypass encoding engine assumes a fixed probability distribution for the input bins. The decoding technique for CABAC decoding reverses the process.

The CABAC encodes the symbols conceptually using two steps. In the first step, the CABAC performs a binarization of the input symbols to bins. In the second step, the CABAC performs a conversion of the bins to bits using either the bypass encoding engine or the regular encoding engine. The resulting encoded bit values are provided in the bitstream to a decoder.

The CABAC decodes the symbols conceptually using two steps. In the first step, the CABAC uses either the bypass decoding engine or the regular decoding engine to convert the input bits to bin values. In the second step, the CABAC performs de-binarization to recover the transmitted symbol value for the bin values. The recovered symbol value may be non-binary in nature. The recovered symbol value is used in remaining aspects of the decoder.

As previously described, the encoding and/or decoding process of the CABAC includes at least two different modes of operation. In a first mode, the probability model is updated based upon the actual coded bin value, generally referred to as a "regular coding mode" The regular coding mode, requires several sequential serial operations together with its associated computational complexity and significant time to complete. In a second mode, the probability model is not updated based upon the actual coded value, generally referred to as a "bypass coding mode". In the second mode, there is no probability model (other than perhaps a fixed probability) for decoding the bins, and accordingly there is no need to update the probability model which reduces the computational complexity of the system.

Scalable video coding enables the encoding and decoding of a high quality video bitstream that includes one or more subset bitstreams that can themselves be encoded and decoded. In many cases, the subset bitstream is derived by dropping packets from the larger bitstream. The subset bitstream may represent a lower spatial resolution (e.g., picture size spatial scalability), a lower temporal resolution (e.g., frame rate), a lower quality video signal (e.g., signal-to-noise-ratio, quality, fidelity), a lower number of views, a lower bit-depth, and/or a different color space compared to the bitstream from which it is derived. By using a scalable video coding technique, the decoder has the capability of reconstructing lower spatial resolution, lower temporal resolution, lower quality video signal from a complete or partial bitstream, lower number of views, lower bit-depth, and/or different color space which is especially suitable for different decoding devices, adaptation to changing bandwidth conditions, adaptation to different spatial formats, adaptation to different available network bitrates, and/or adaptation to power constraints.

Figure 10:
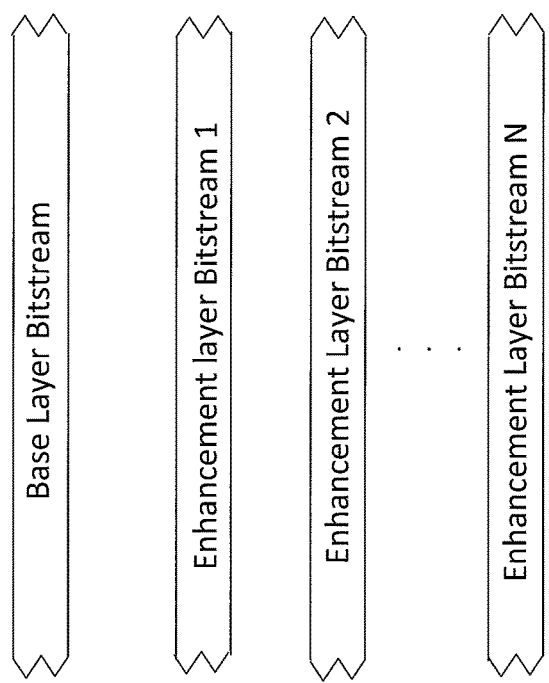
FIG. 10 illustrates a base layer bitstream and an enhancement bitstream.

Referring to FIG. 10, a primary bitstream, generally referred to as a base layer bitstream, is received by a decoder. In addition to the primary bitstream, the decoder may receive one or more secondary bitstreams, each of which is generally referred to as an enhancement layer bitstream. Typically, the base layer bitstream and the enhancement layer bitstreams are included within a single composite bitstream, but in some embodiments may be separate bitstreams. The enhancement layer bitstream enables the enhancement of the quality of the base layer bitstream, increasing the frame rate of the base layer bitstream, increasing the pixel resolution of the base layer bitstream, increasing the number of views, increasing the bit-depth, and/or different color space.

Figure 11:
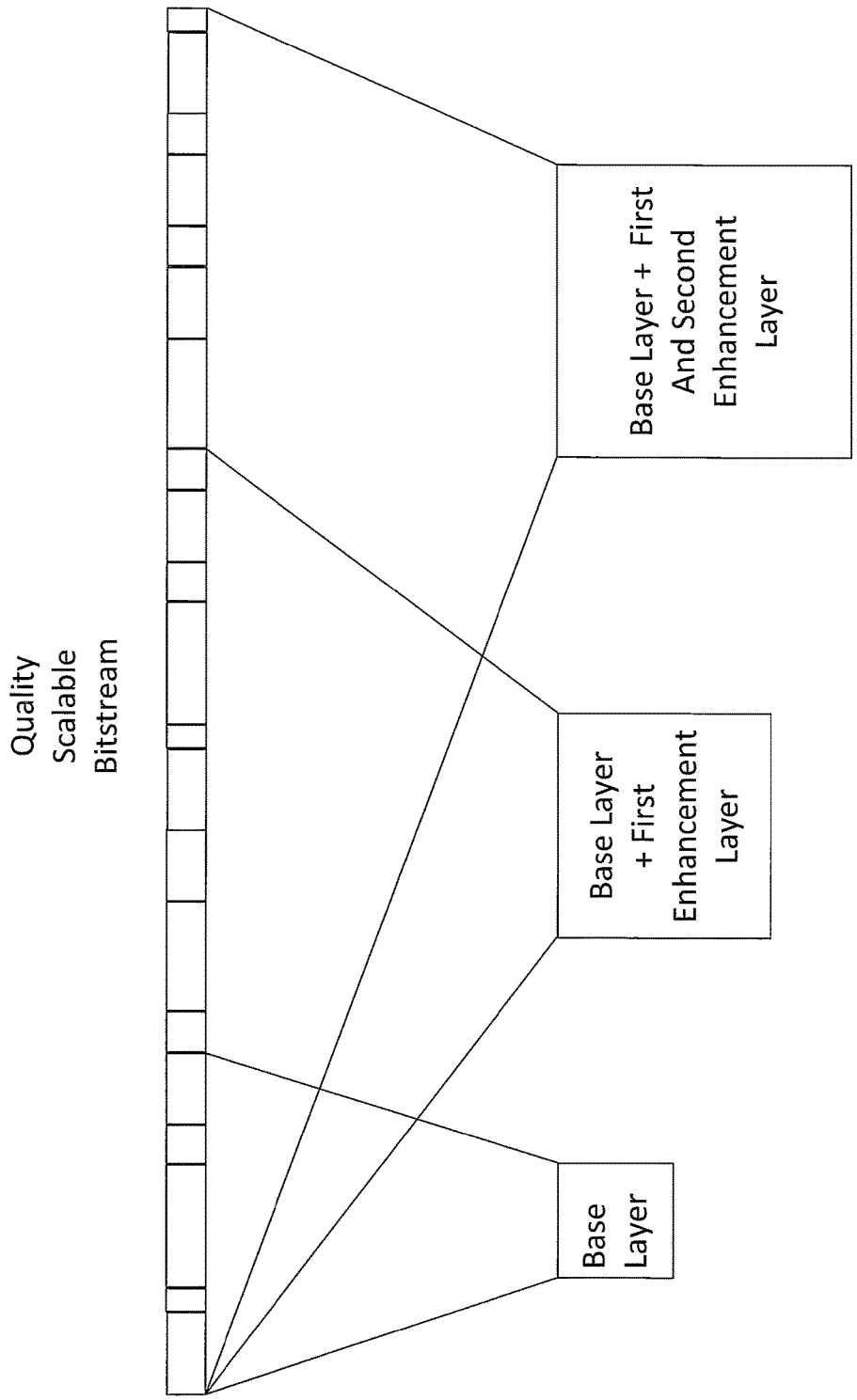
FIG. 11 illustrates a quality scalable bitstream.

Referring to FIG. 11, an exemplary quality scalable bitstream illustrates a scalable bitstream with a base layer, a first enhancement layer, and a second enhancement layer. The resulting video is either (1) the base layer, (2) the base layer plus the first enhancement layer, or (3) the base layer plus the first enhancement layer plus the second enhancement layer. With the increasing enhancement layers, the quality of the video increases.

Figure 12:
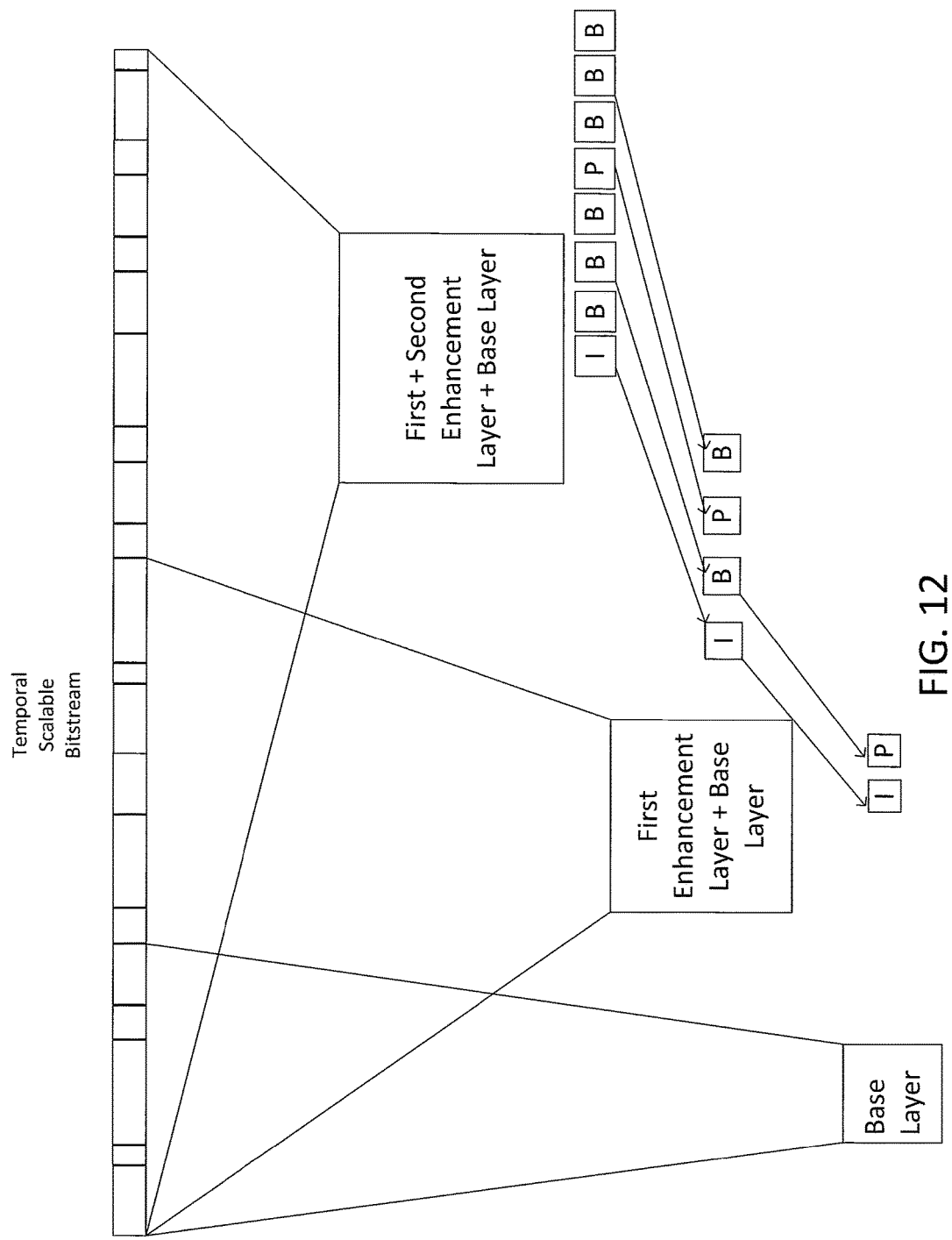
FIG. 12 illustrates a temporal scalable bitstream.

Referring to FIG. 12, an exemplary temporal scalable bitstream illustrates a scalable bitstream with a base layer, a first enhancement layer, and a second enhancement layer. The I refers to intracoded pictures, the P refers to predicted pictures, and the B refers to bidirectional predicted pictures. The resulting video is either (1) the base layer, (2) the base layer plus the first enhancement layer, or (3) the base layer plus the first enhancement layer plus the second enhancement layer. With the increasing enhancement layers, the temporal rate of the video increases.

Figure 13:
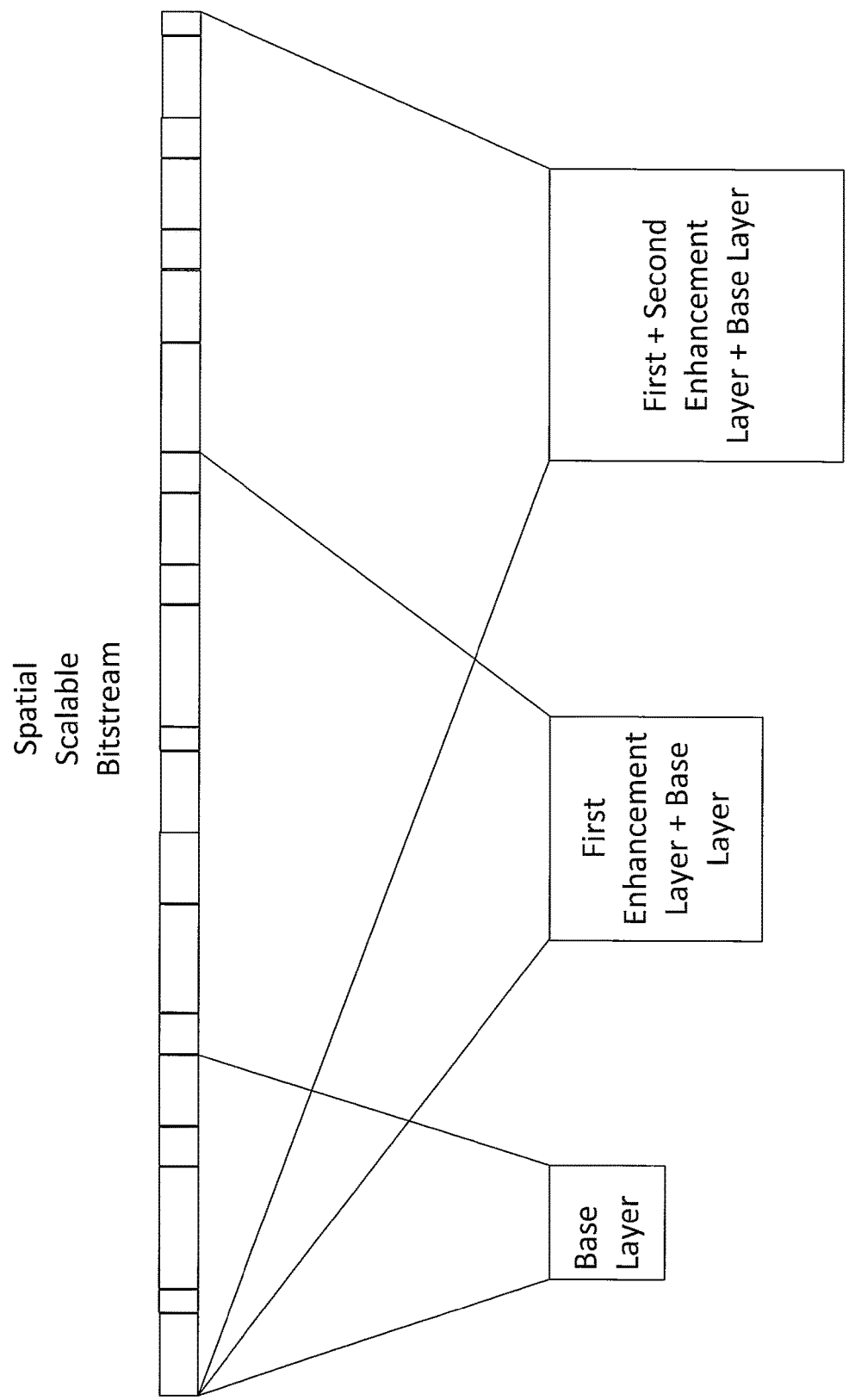
FIG. 13 illustrates a spatial scalable bitstream.

Referring to FIG. 13, an exemplary spatial scalable bitstream illustrates a scalable bitstream with a base layer, a first enhancement layer, and a second enhancement layer. The resulting video is either (1) the base layer, (2) the base layer plus the first enhancement layer, or (3) the base layer plus the first enhancement layer plus the second enhancement layer. With the increasing enhancement layers, the spatial size of the video increases.

Figure 14:
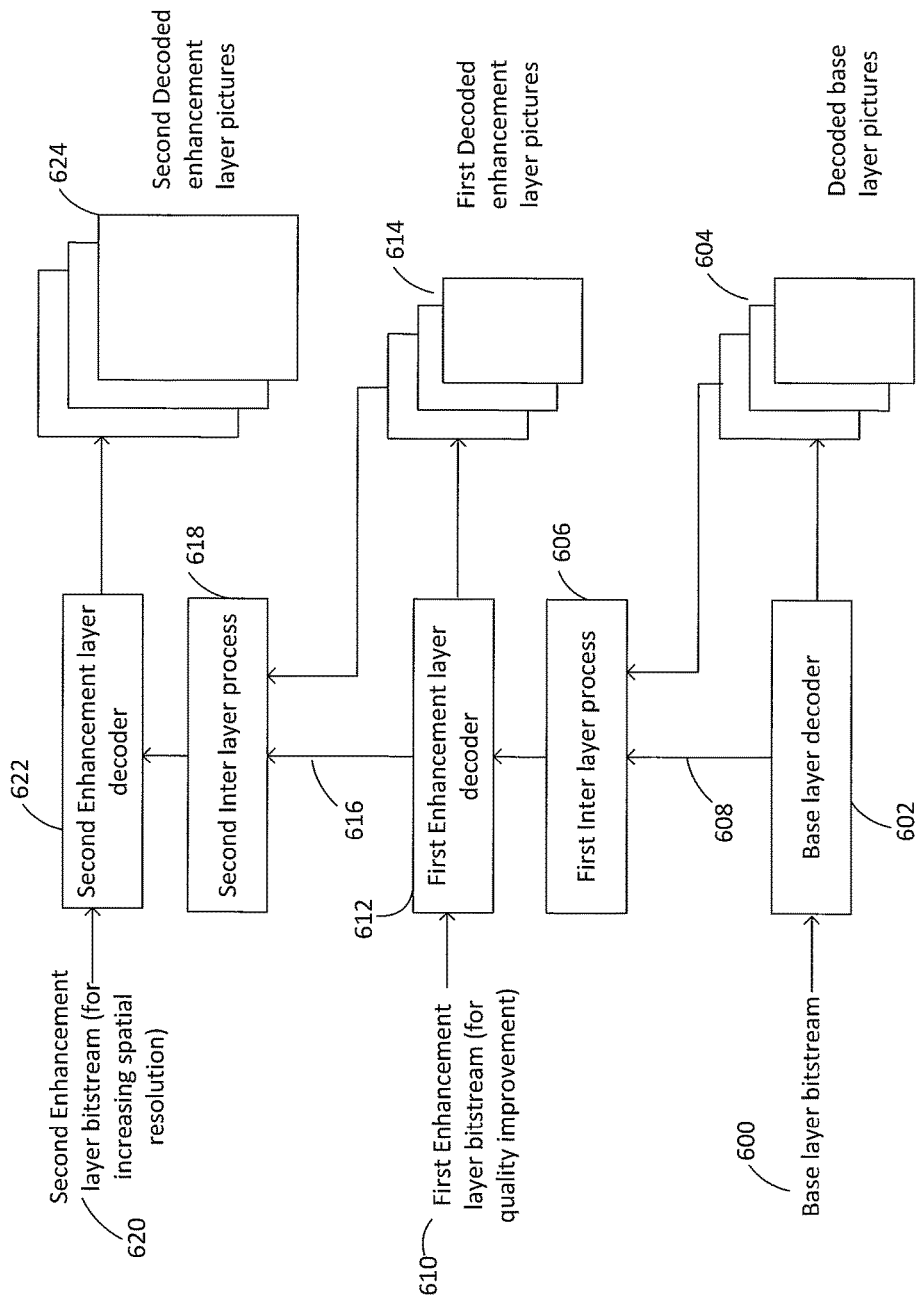
FIG. 14 illustrates an exemplary decoding technique.

Referring to FIG. 14, an exemplary decoding process for a scalable video decoder with two enhancement layers is illustrated. A base layer bitstream 600 is received by a base layer decoder 602 which provides decoded base layer pictures 604. The decoded base layer pictures 604 and base data 608 from the base layer decoder 602 are provided to a first inter layer process 606. The first inter layer process 606 may perform an inter layer processes to achieve increased coding efficiency. The data from the first inter layer process 606 together with a first enhancement layer bitstream 610 may be decoded by a first enhancement layer decoder 612. For example, the first enhancement layer bitstream 610 may be suitable for quality improvement. The first enhancement layer decoder 612 provides first decoded enhancement layer pictures 614. The first decoded enhancement layer pictures 614 and first data 616 from the first enhancement layer decoder 612 are also provided to a second inter layer process 618. The second inter layer process 618 may perform an inter layer processes to achieve increased coding efficiency. The data from the second inter layer process 618 together with a second enhancement layer bitstream 620 maybe decoded by a second enhancement layer decoder 622. For example, the second enhancement layer bitstream 620 may be suitable for spatial improvement. The second enhancement layer decoder 622 provides second decoded enhancement layer pictures 622. This process may be extended, as desired.

It was determined that the information in the enhancement layers in some cases tends to be sufficiently similar to the information being communicated in the base layer, and accordingly the use of the regular coding engine provides a substantial decrease in the bitrate over the bypass coding engine. In other cases, the information in the enhancement layers tends to be sufficiently dissimilar to the information being communicated in the base layer, and accordingly the use of the regular coding engine with different initialization tables provides a substantial decrease in the bitrate over the bypass coding engine. It was further determined that the information in the enhancement layers tends to be sufficiently similar to one another and/or tend to have characteristics sufficiently similar to the base layer, and accordingly the use of the regular coding engine provides a substantial decrease over the bypass coding engine when selected initialization tables are used.

Figure 15:
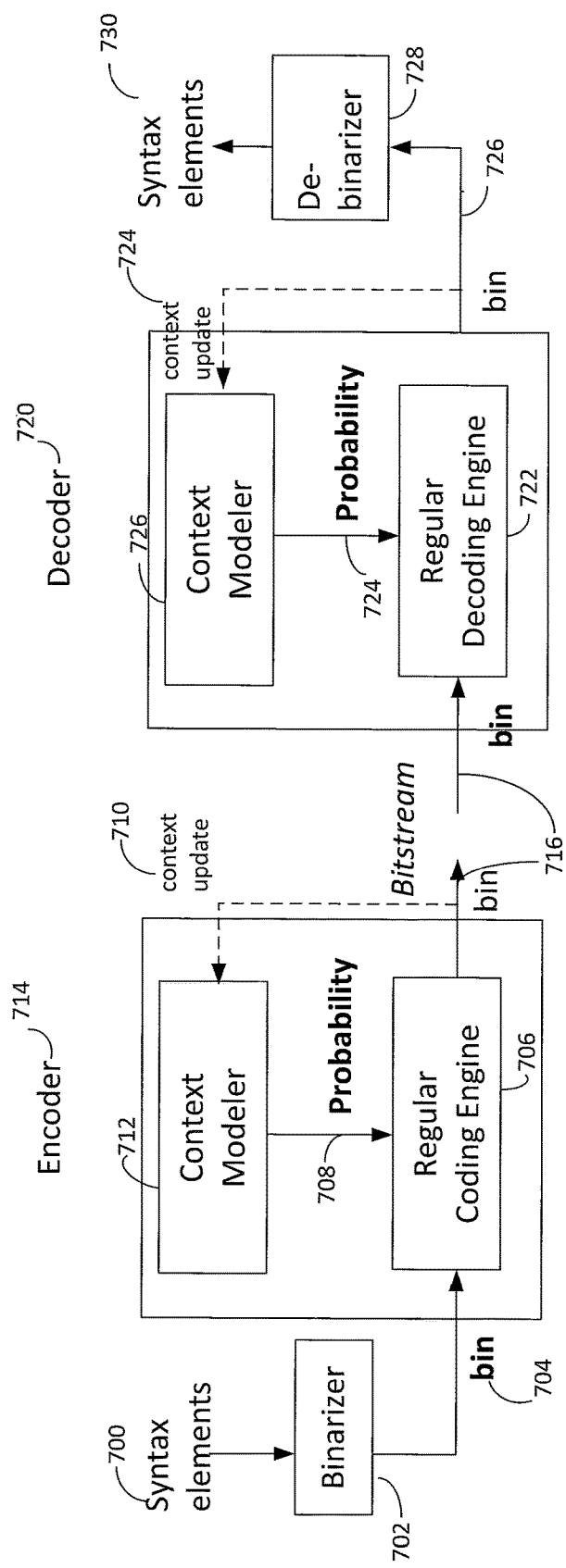
FIG. 15 illustrates selected aspects of a CABAC encoder and decoder.
Figure 16:
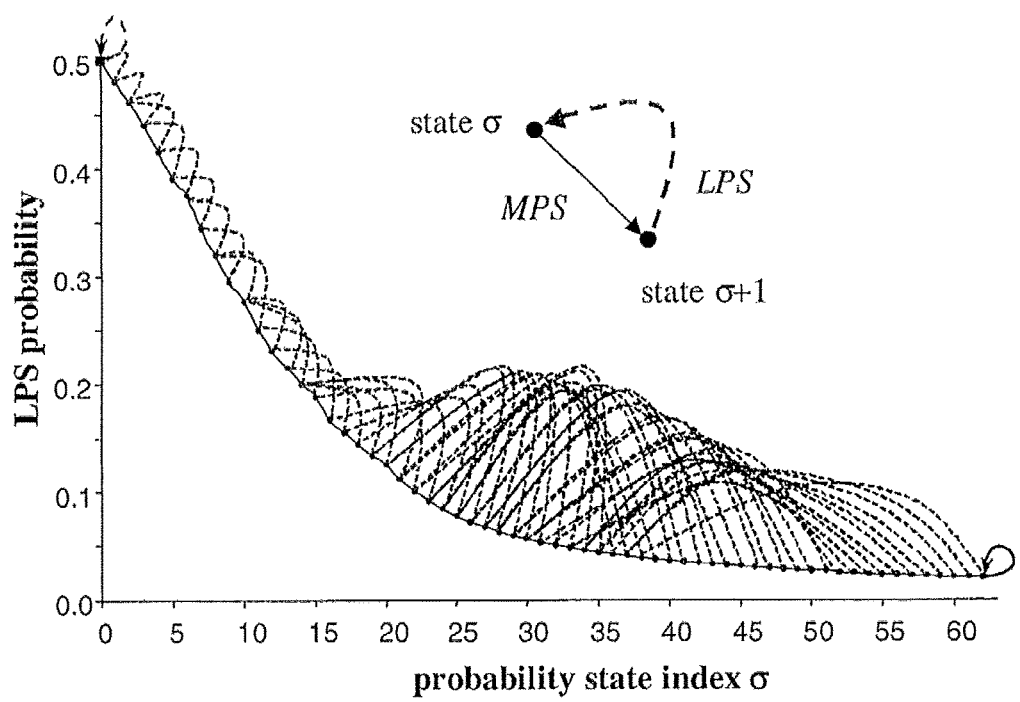
FIG. 16 illustrates LPS probabilities.

Referring to FIG. 15 in addition to FIG. 9, the non-binary syntax elements 700 are processed by the binarizer 702 of the encoder 714. The resulting binary values 704 are processed by the regular coding engine 706 in combination with a corresponding probability 708. The probability information is preferably represented by a most probable symbol ("MPS") and a least probable symbol ("LPS") probability. The most probable symbol refers to which symbol has the highest probability for the binary value currently being coded, such as "0" or "1". The least probable symbol probability refers to the probability that the symbol different than the most probable symbol is the proper choice. Accordingly, the most probable symbol may be "1" with the least probable symbol probability being 0.2 (e.g., probability that the symbol is "0"). The output of the regular coding engine 706 is used as a context update 710 for a context modeler 712. The probability update for the context modeler 712 may be achieved in any suitable manner, such as illustrated in FIG. 16. FIG. 16 illustrates changes in the probability state index which results in a change in the LPS probability for the context modeler. The output of the regular coding engine 706 provides a binary bitstream 716.

The decoder 720 receives the binary bitstream 716. The bits of the binary bitstream are processed by the regular decoding engine 722 in combination with a corresponding probability 724. The probability information is preferably represented by the most probable symbol ("MPS") and the least probable symbol ("LPS") probability. The most probable symbol refers to which symbol has the highest probability for the binary value currently being coded, such as "0" or "1". The least probable symbol probability refers to the probability that the symbol different than the most probable symbol is the proper choice. Accordingly, the most probable symbol may be "1" with the least probable symbol probability being 0.2 (e.g., probability that the symbol is "0"). The output of the regular decoding engine 722 is used as a context update 724 for a context modeler 726. The probability update for the context modeler 726 may be achieved in any suitable manner, such as illustrated in FIG. 16. The output of the regular decoding engine 722 provides a binary bitstream 726 that may be processed by the de-binarizer 728 to provide syntax elements 730.

Figure 17:
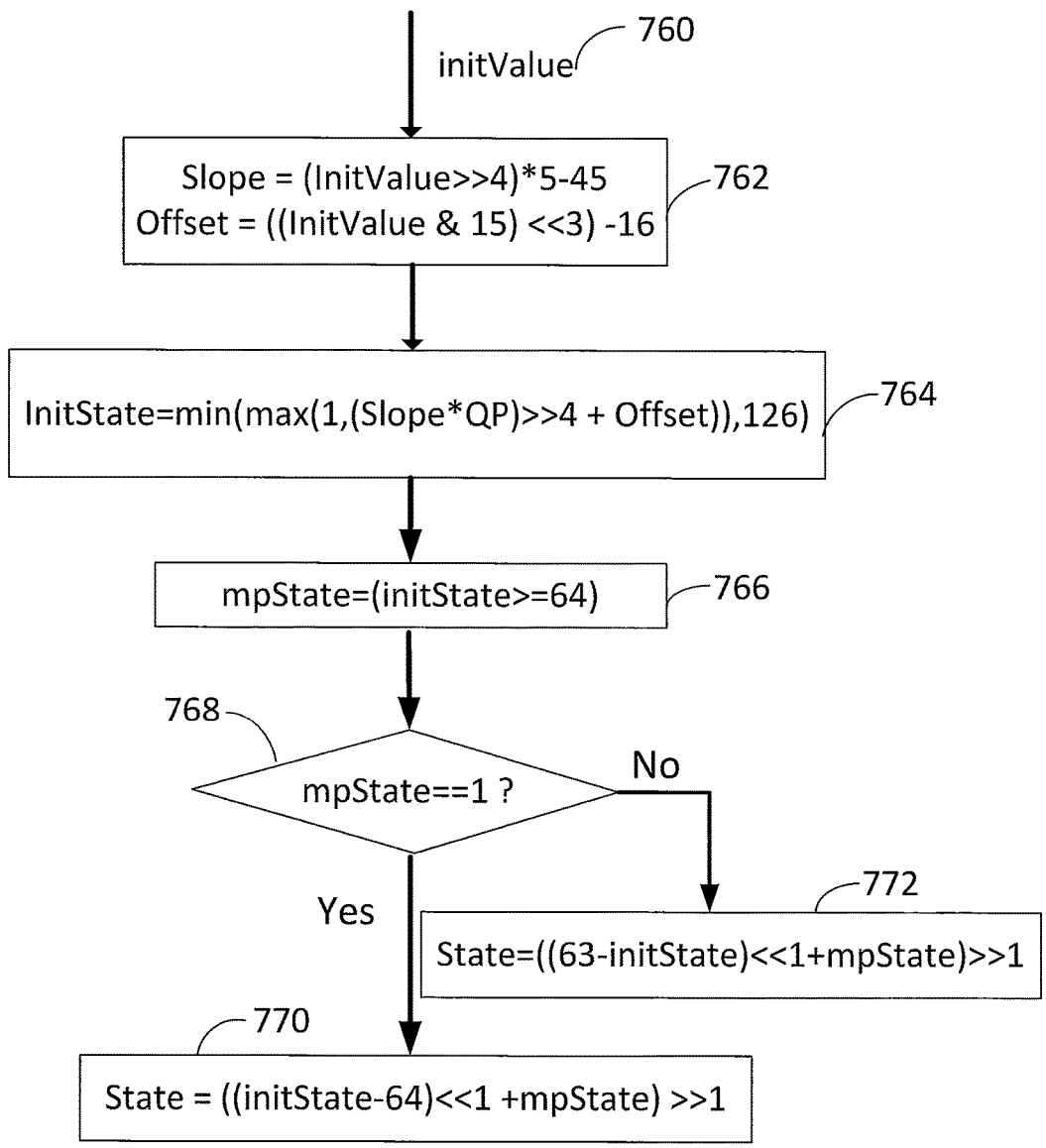
FIG. 17 illustrates a probability determination.

The probability of the encoder 714 and/or decoder 720 are initialized with an initial probability, typically in the form of a table of values. It was further determined that the characteristics of the base layer and the characteristics of the enhancement layer are sufficiently different, that to improve the coding efficiency the tables selected in each should be different from one another in some respect. Referring to FIG. 17, the determination of the MPS and LPS probability may be based upon an initialization value ("initValue") 760 such as from a table. The initValue 760 is used to determine a slope and an offset 762. The slope generally reflects how the probability is changing and the offset generally reflects the probability. An initialization state ("initState") 764 is used to represent the probability information of the MPS and LPS probability, which may be based upon a corresponding quantization parameter ("QP"), the slope, and the offset. The maximum probability symbol ("mpState") 766 determines the most probable symbol based upon the initState 764. If initState 766 is greater than or equal to 64 then MPS=1, and if initState 766 is less than 64 then MPS=0. If mpState is equal to 1 768 then the probability state 770 is selected. Alternatively, if mpState is equal to 0 768 then the probability state 772 is selected. The different state references corresponding portions of the same or different tables for suitable probability values, such as the LPS probabilities.

Referring to FIG. 18, the initValue 760 may be used to determine a particular group 780 that the initValue 760 is a member of, such as one of 16 groups. The particular group 780 may correspond to a particular slope 784 and a particular offset 786. In this manner, one or more tables may be used to determine the slope and offset.

Figure 20:
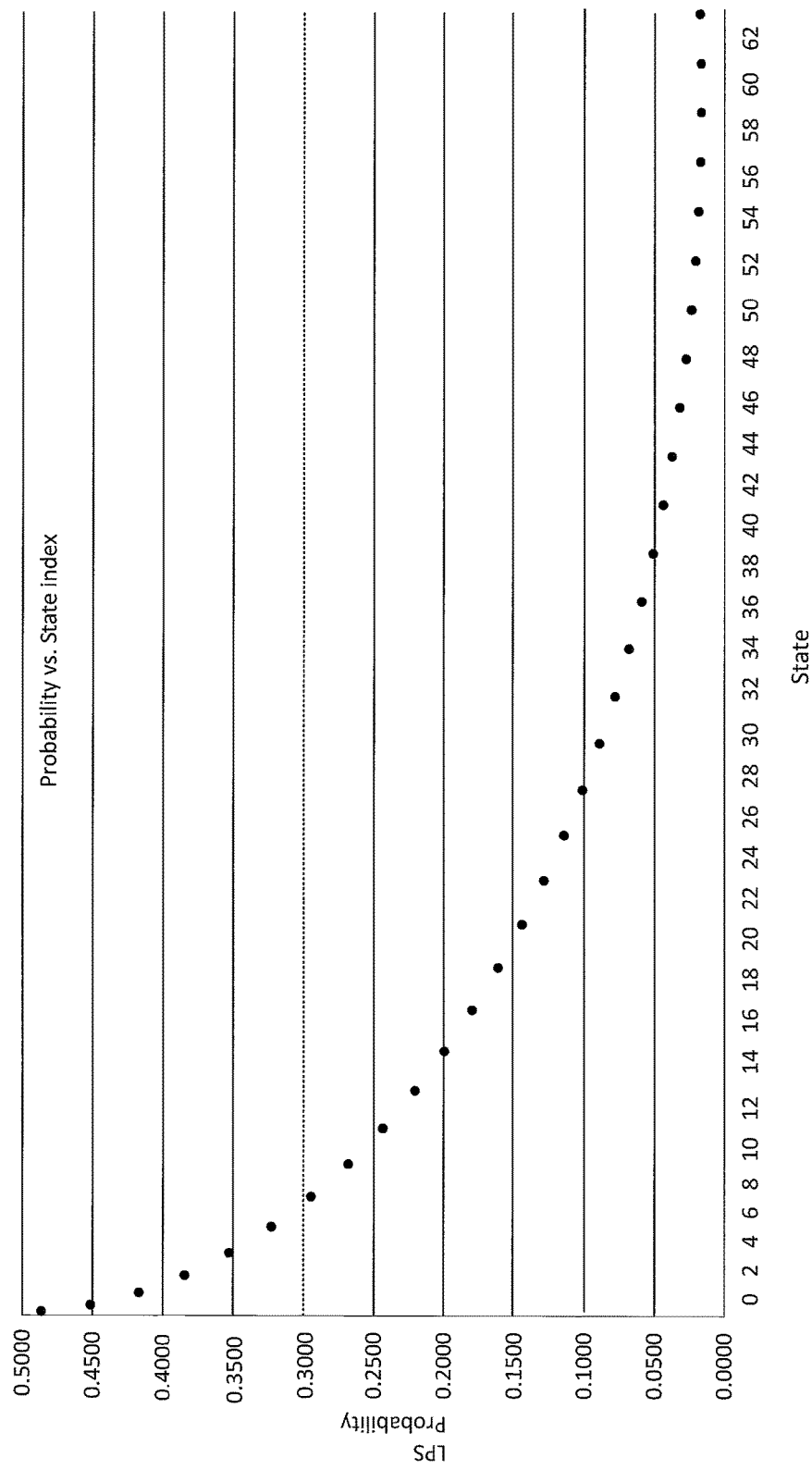
FIG. 20 illustrates a probability graph.

Referring to FIG. 19, the initState 764 may be used to determine the mpState 766, the corresponding state 770, 772, and thus the corresponding LPS probability 788. A group of the LPS probabilities in relation to the state index of FIG. 19 is illustrated graphically in FIG. 20.

Figure 21:
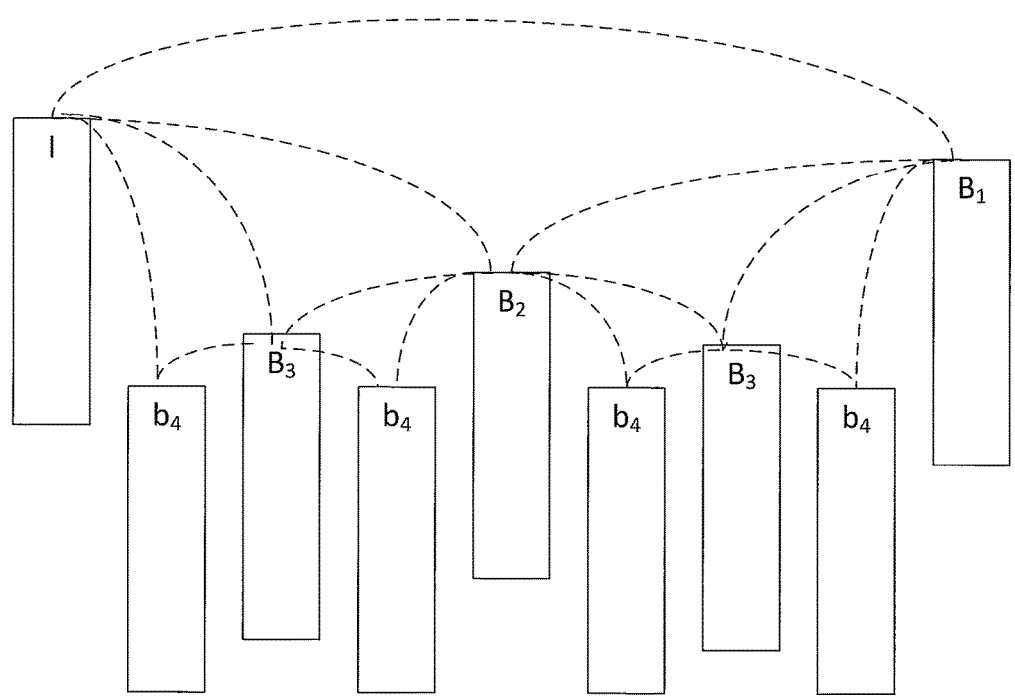
FIG. 21 illustrates a hierarchical structure of frames.

Referring to FIG. 21, an exemplary hierarchical structure of video frames is illustrated. The exemplary frames may be organized as 5 groups of frames, namely, an I frame, a $B_1$ frame, a $B_2$ frame, a pair of $B_3$ frames, and four $b_4$ frames. Each of these groups of frames may use different prediction types, and likely a different quantization parameter. Thus, different statistics for symbols are likely in each of the groups. These groups may further be provided using a base layer and four enhancement layers. To increase the performance achieved, including the use of the enhancement layer, an improved initialization of the probabilities may take into account the hierarchical coding structure, as opposed to merely the type of encoding (e.g., I (intra predicted frame), P (predicted frame), B (bi-directionally predicted frame)). The system may classify the five groups into N-types and use a different context "initValue" for a plurality of the different types to more efficiently adapt to the statistical distribution in a manner taking into account the hierarchical coding structure. For example, type 1 may be I; type 2 may be $B_1$, $B_2$, $B_3$; and type 3 may be $b_1$, $b_2$, $b_3$, $b_4$.

Figure 22:
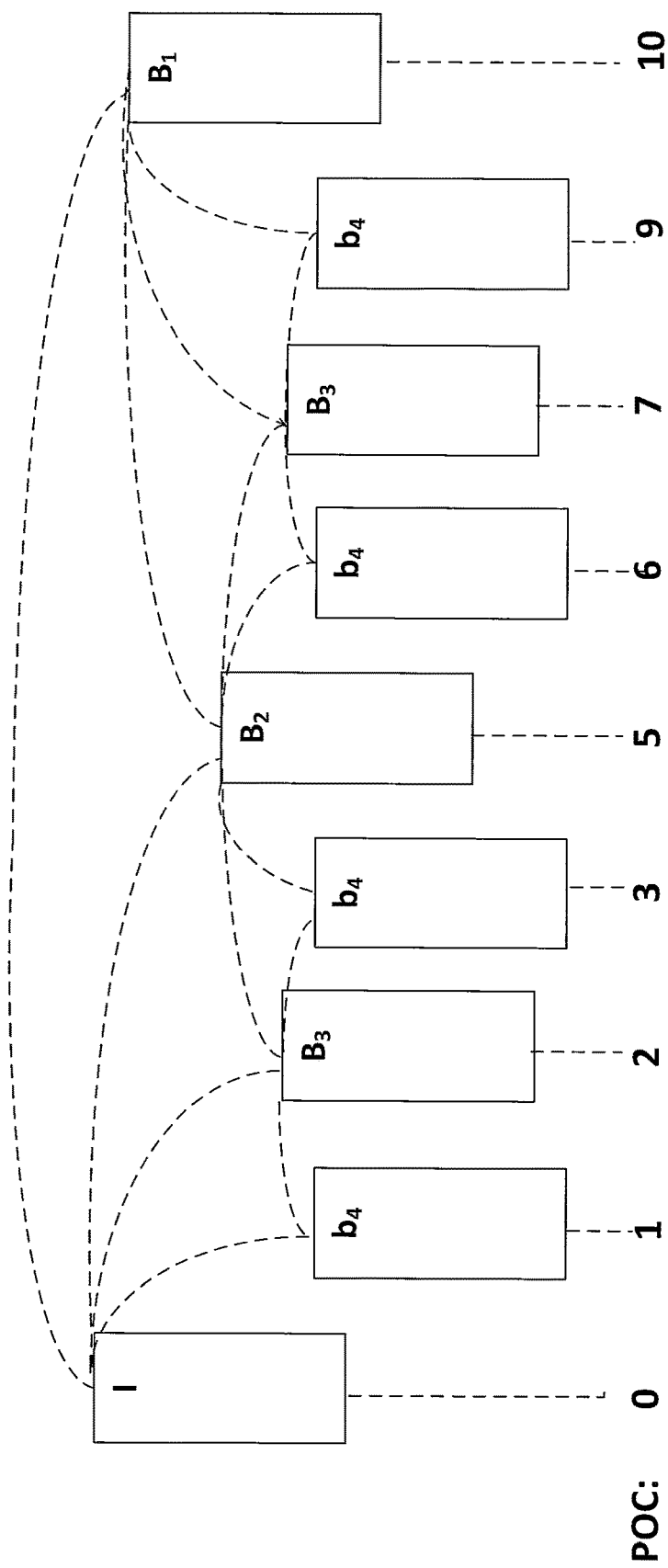
FIG. 22 illustrates a hierarchical structures of frames with picture order count.

The video coding technique may use a picture order count ("POC") to identify the order of pictures. The picture order count may be an increasing number assigned to each frame, in output order or otherwise, which may occur in a recurring manner. Referring to FIG. 22, a set of frames may be grouped using a picture order count. Each of the groups of picture order counts may use a different prediction type, and likely a different quantization parameter. Thus, different statistics are likely for symbols in each of the groups. These groups may further be provided using a base layer and four enhancement layers. To increase the performance achieved, including the use of an enhancement layer, an improved initialization of the probabilities may take into account the hierarchical coding structure, as opposed to merely the type of encoding (e.g., I (intra predicted frame), P (predicted frame), B (bi-directionally predicted frame)). The system may classify the groups into N-types and use a different "initValue" for a plurality of the different types to more efficiently adapt to the statistical distribution in a manner taking into account the hierarchical coding structure. For example, type 1 may be $B_1$ POC %8==0 (where 8 is the group of pictures between intra coded frames); type 2 may be $B_2$ POC %8==4; type 3 may be $B_3$ POC %8==(2, 6); and $b_4$ POC %8==(1, 3, 5, 7). % is a remainder operation, which in this case is divide by 8 and test if the remainder equals a value.

Figure 23:
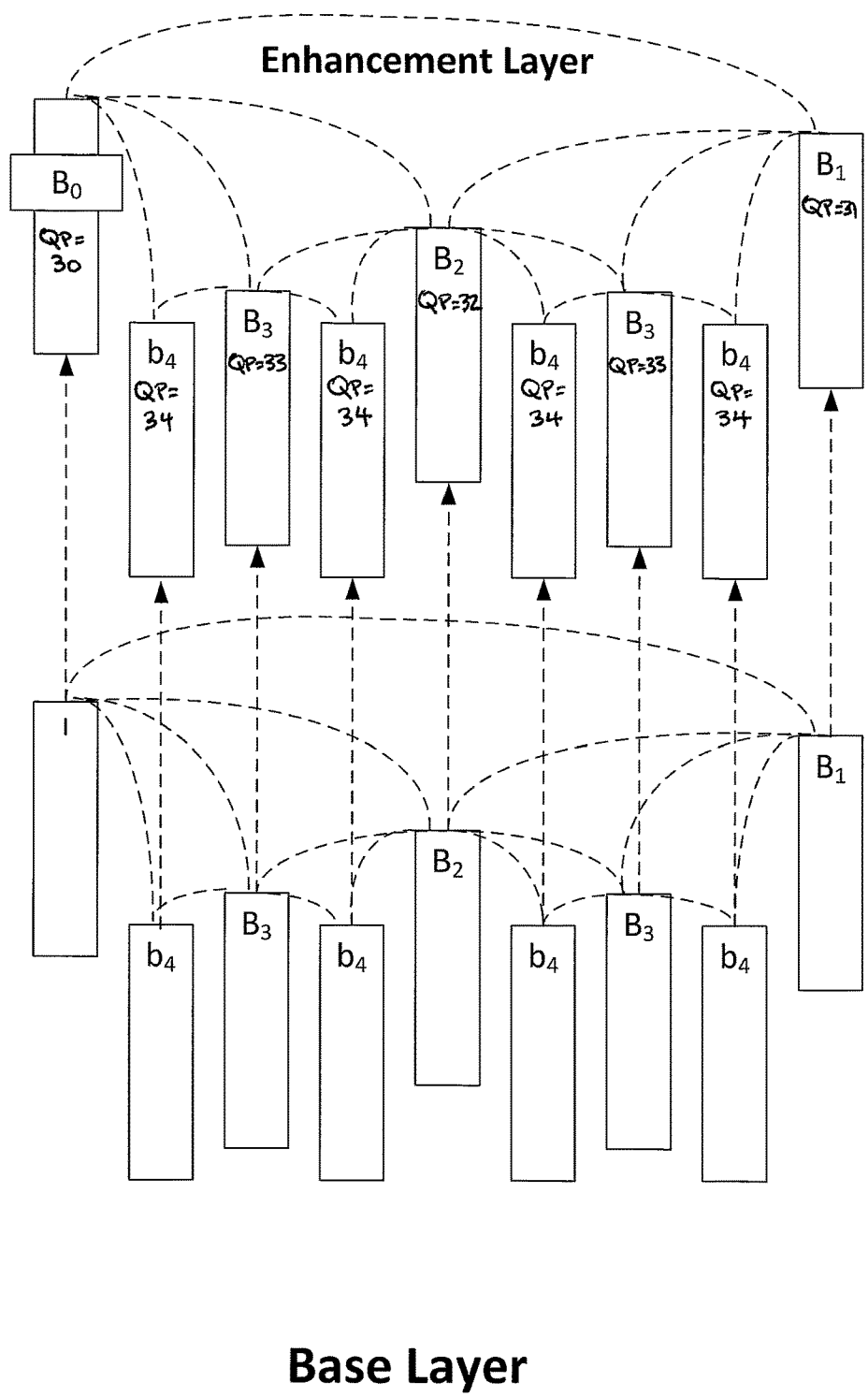
FIG. 23 illustrates a hierarchical structure of frames with quantization parameters.

In the enhancement layer coding illustrated in FIG. 23, the video coding technique may use the quantization parameter, and in particular an offset quantization parameter of a particular frame to a reference enhancement layer frame of which corresponding base layer is I frame. Each of the groups of offset quantization parameters may use a different prediction type. Thus, it may be expected different statistics for symbols in each of the groups. This may be used in combination with the base layer and the enhancement layers, if desired. The system may classify the groups into N-types and use a different "initValue" for a plurality of the different types to more efficiently adapt to the statistical distribution. For example, type 1 may be $B_0$ QP; type 2 may be $B_1$ QP+1

(offset QP==1); type 3 may be $B_2$ QP+2 (offset QP==2); type 4 may be $B_3$ QP+3 (offset QP==3); and type 5 may be $b_4$ QP+4 (offset QP==4).

Figure 30:
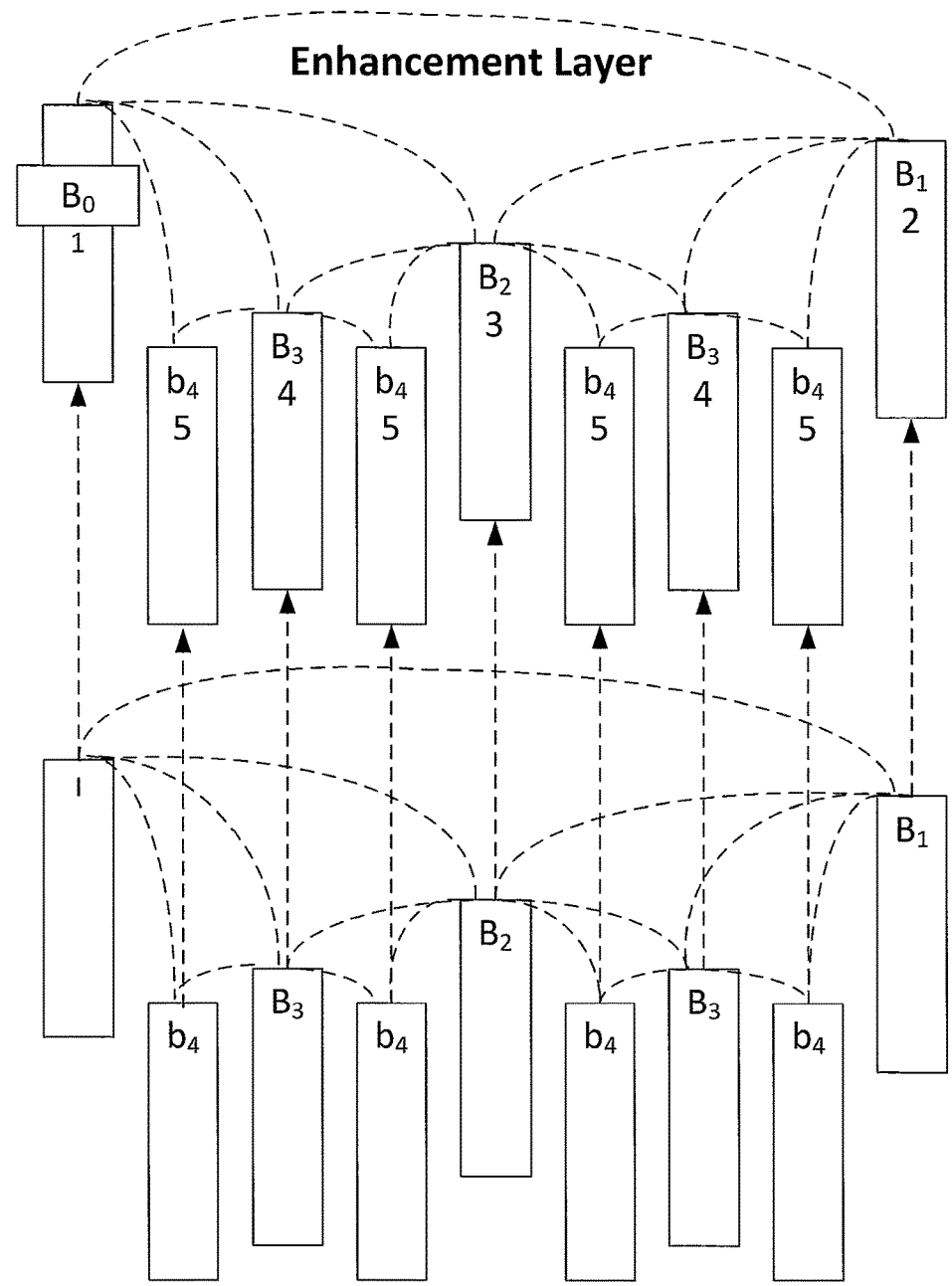
FIG. 30 illustrates a base layer and an enhancement layer with temporal identification.

In the enhancement layer coding illustrated in FIG. 30, the video coding technique may use the temporal identification. Each of the groups of temporal identification parameters may use a different prediction type. Thus, it may be expected different statistics for symbols in each of the groups. This may be used in combination with the base layer and the enhancement layers, if desired. The system may classify the groups into N-types and use a different "initValue" for a plurality of the different types to more efficiently adapt to the statistical distribution. For example, type 1 may be $B_0$ TemporalID 1; type 2 may be $B_1$ TemporalID 2; type 3 may be $B_2$ TemporalID 3; type 4 may be $B_3$ TemporalID 4; and type 5 may be $b_4$ TemporalID 5.

Figure 24:
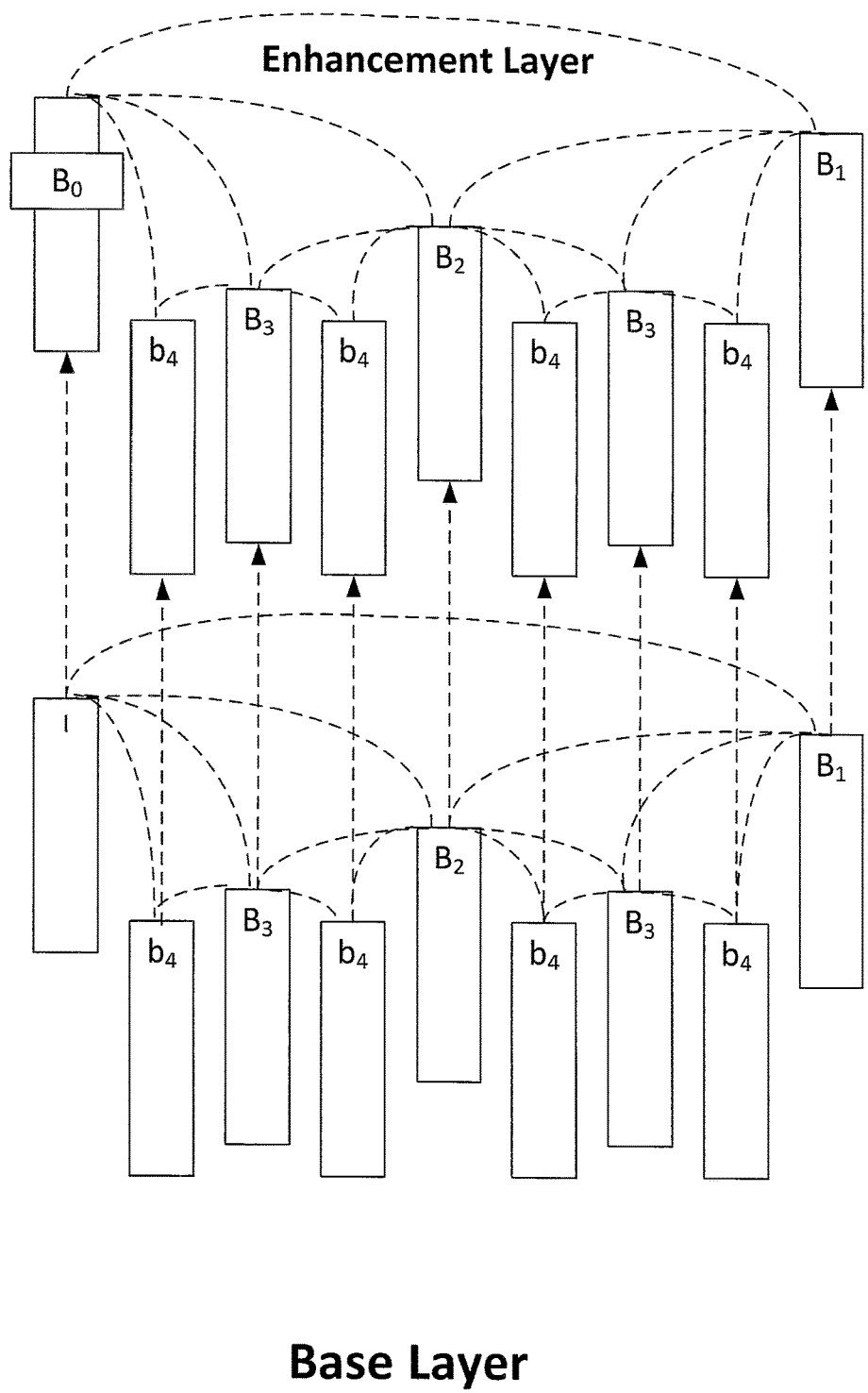
FIG. 24 illustrates a hierarchical structure of frames using a base layer and an enhancement layer(s).

Referring to FIG. 24, the video coding technique may use the base layer as the basis upon which to select a suitable initialization technique for the corresponding enhancement layer because there tends to be a correlation in the statistical distribution of symbols between the base layer and the enhancement layer in a manner different from the encoding technique used for the frame. In addition, the initValue used in the enhancement layer, for the same or different types of encoding techniques of the corresponding base layer, may be different. For example, the initialization values for the $B_0$ frame may be considered the same as the underlying I slice when selecting the initValue because of its corresponding base layer picture is an I frame. For example, a B slice in an enhancement layer may be considered a P slice when selecting the initValue because of its corresponding base layer slice is a P slice. For example, a P slice in an enhancement layer may be considered a B slice when selecting the initValue because of its corresponding base layer slice is a B slice. Other initValues for the enhancement layer pictures may be selected in combination with base layer pictures.

Figure 25:
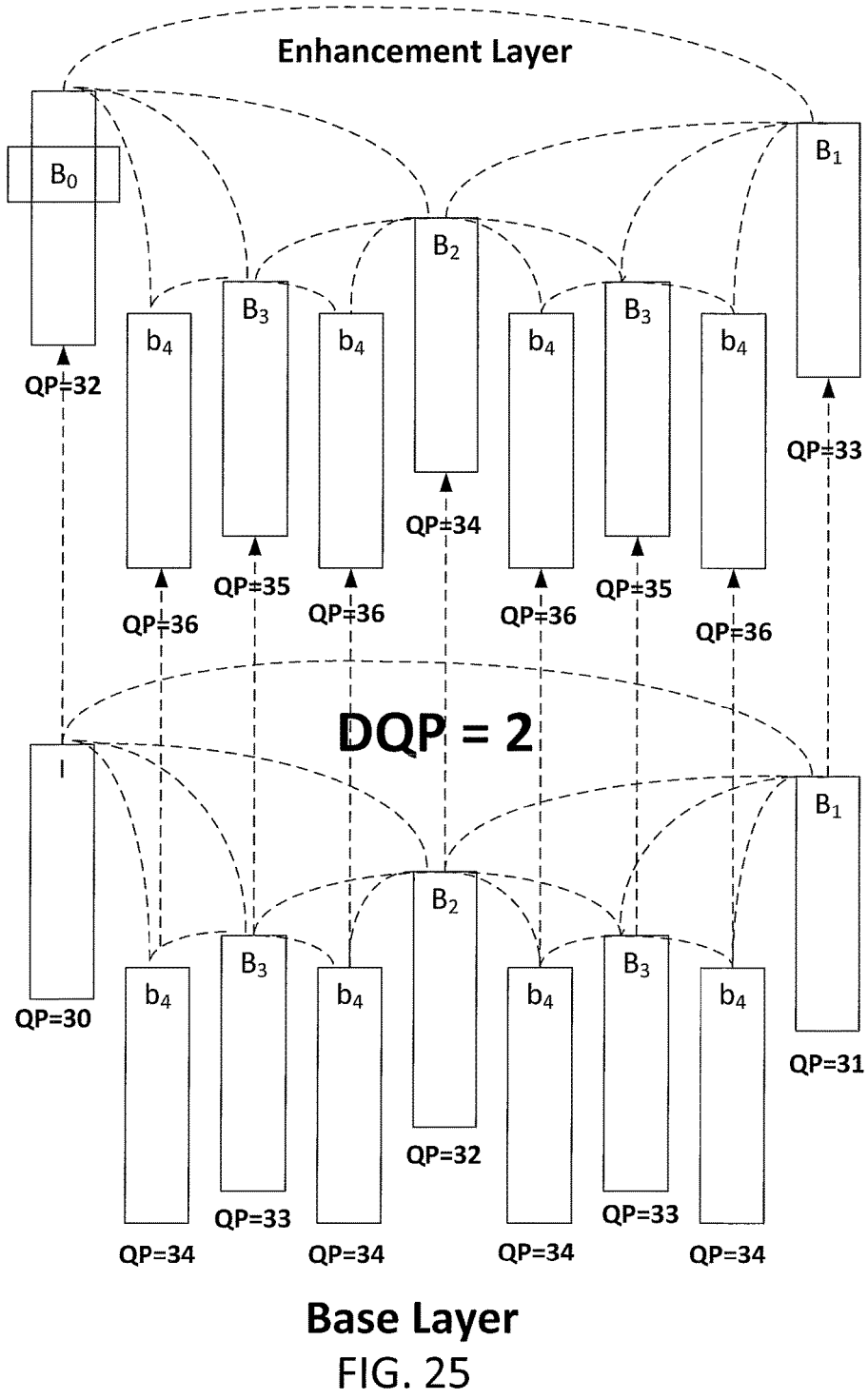
FIG. 25 illustrates a base layer and an enhancement layer with a uniform delta quantization parameter.

As illustrated in FIG. 25, the video coding technique may use the delta quantization parameter, and in particular a difference of quantization parameters between a selected enhancement frame and its corresponding reference base frame. Each of the groups of difference quantization parameters may use different prediction values. Thus, different statistics are likely for symbols in each of the groups of different quantization parameters. The system may classify the groups into N-types and use a different "initValue" for a plurality of the different types to more efficiently adapt to the statistical distribution. The difference quantization parameter may be, for example, the quantization parameter of a frame of the enhancement layer minus the quantization parameter of a corresponding frame of the base layer, such as on a frame by frame basis. In some cases, the difference quantization parameter ("DQP") may be uniform for a substantial set of sequential frames. For example, type 1 may be DQP=−2; type 2 may be DQP=0; type 3 may be DQP=2; type 4 may be DQP=4; etc.

Figure 26:
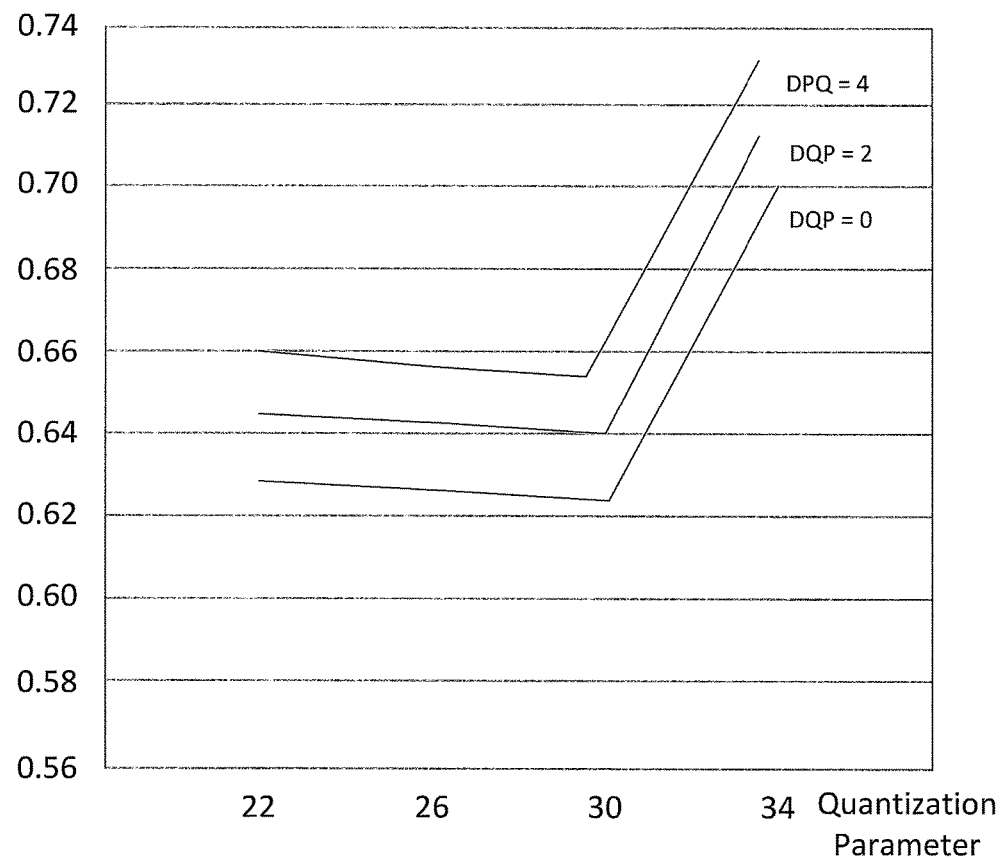
FIG. 26 illustrates overall probability changes based on delta quantization parameters and delta quantization variation.

Referring to FIG. 26, it may be observed that the DQP relationship has a similar relationship among different values of DQP. Provided the similar relationship among different values of DQP, a single table may be used for DQP that is adjusted in some manner depending on the DQP value.

Figure 27:
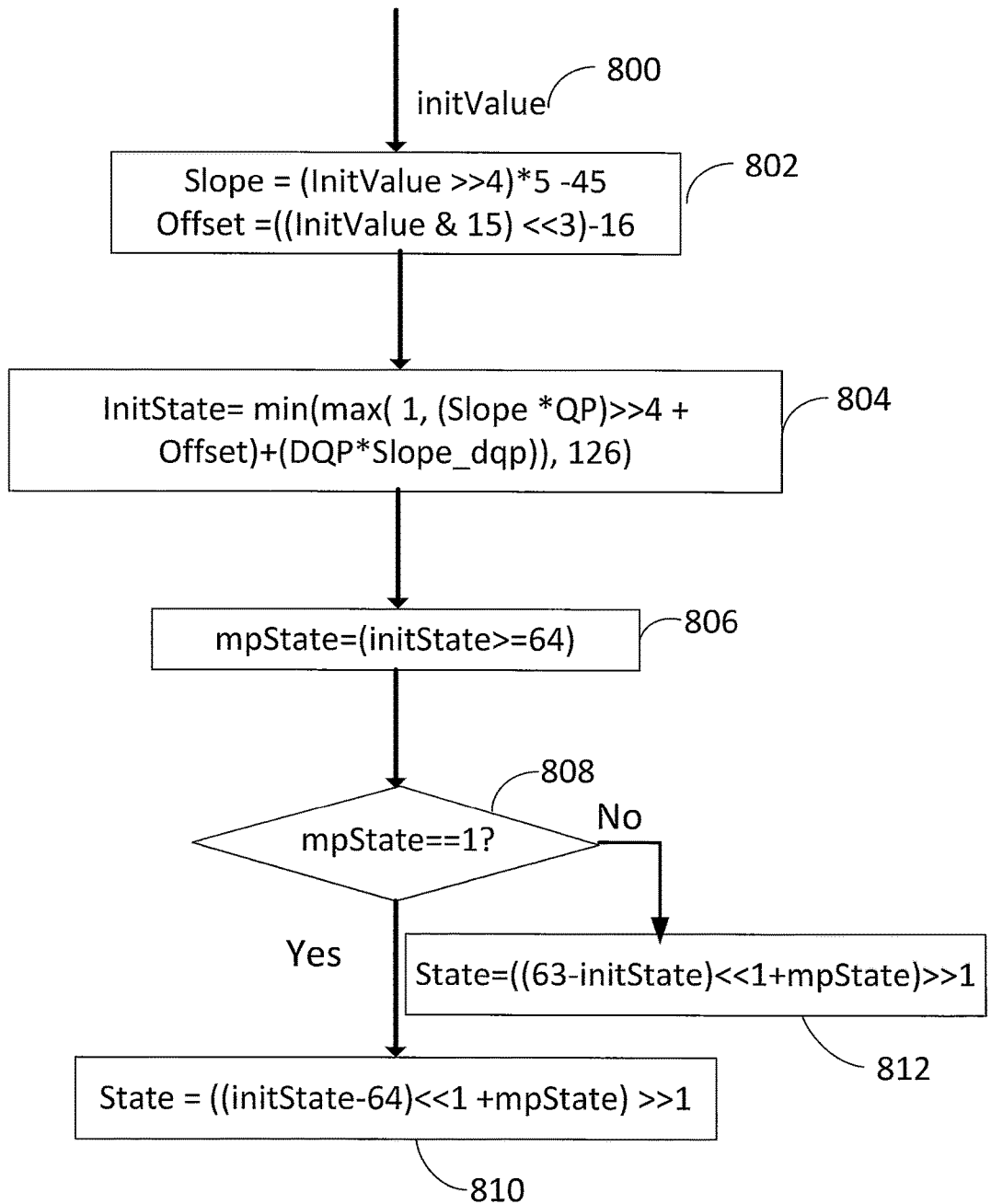
FIG. 27 illustrates a modified probability determination.

Referring to FIG. 27, the determination of the MPS and LPS initial probability may be based upon an initialization value ("initValue") 800 such as from a table. The initValue 800 is used to determine a slope and an offset 802. The slope generally reflects how the probability is changing based on quantization parameter and the offset generally reflects the probability. An initialization state ("initState") 804 is used to represent the probability information of the MPS and LPS probability, which may be based upon a quantization parameter, corresponding difference quantization parameter ("DQP"), the slope, the offset, and a Slope_dpq, where the Slope_dqp represents the probability variation factor based on each context. The maximum probability symbol ("mpState") 806 determines the most probable symbol based upon the initState 804. If mpState 806 is greater than or equal to 64 then MPS=1, and if mpState 806 is less than 64 then MPS=0. If mpState is equal to 1 808 then the probability state 810 is selected. Alternatively, if mpState is equal to 0 808 then the probability state 812 is selected. The different state references corresponding portions of the same or different tables for suitable probability values, such as the LPS probabilities.

Figure 28:
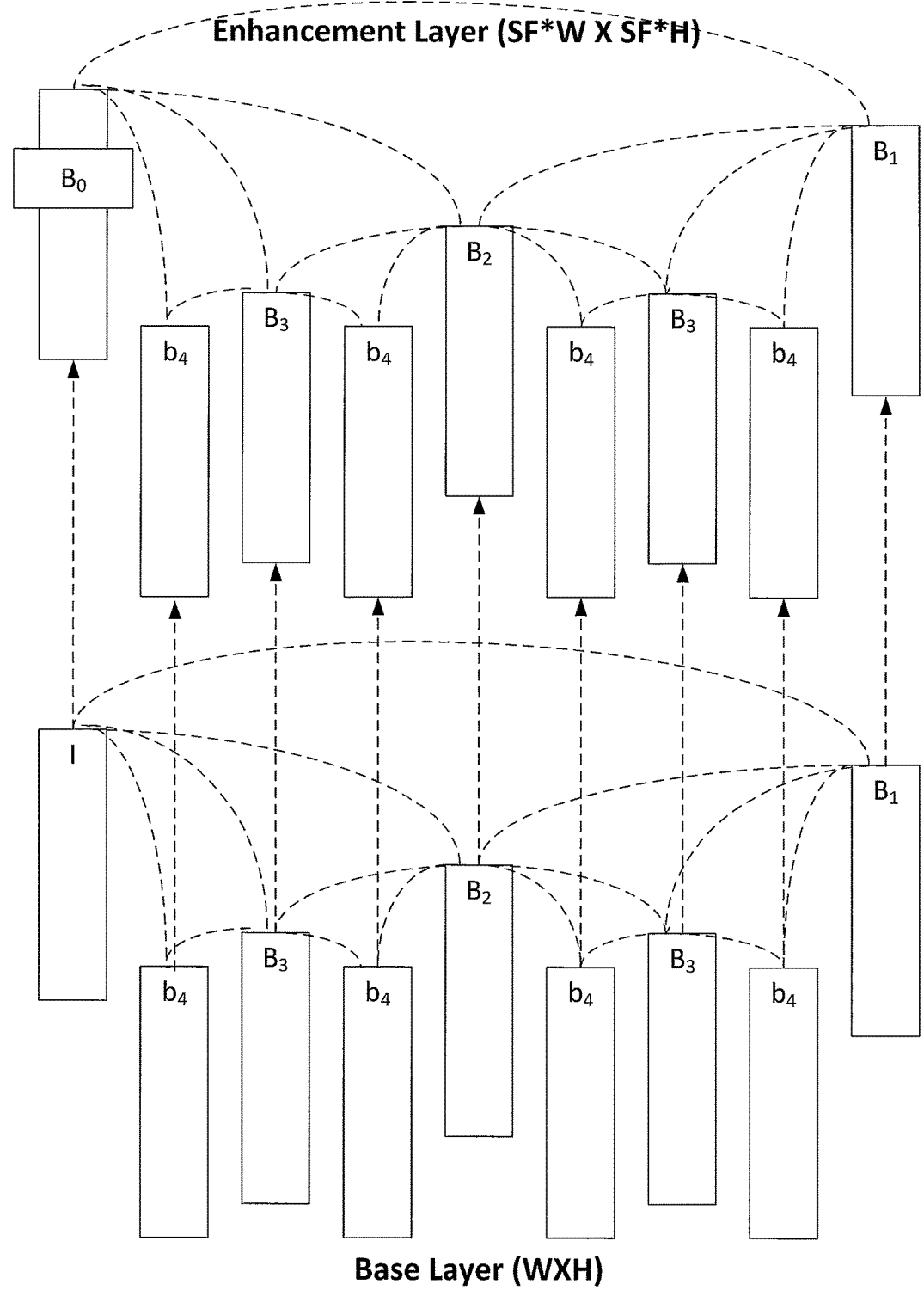
FIG. 28 illustrates a base layer and an enhancement layer based upon a scaling factor.

As illustrated in FIG. 28, the video coding technique may use a scaling parameter between a selected enhancement frame and its corresponding reference base frame, which is typically consistent for a substantial number of sequential frames. It may be expected that different statistics for symbols for each scaling factor, or group of scaling factors, are similar. The system may classify the groups into N-types and use a different "initValue" for a plurality of the different types to more efficiently adapt to the statistical distribution. The scaling parameter may be, for example, the scaling of a frame of the enhancement layer relative to the scaling of a corresponding frame of the base layer, such as on a frame by frame basis. In some cases, the scaling factor may be different for the width and/or height.

Figure 29:
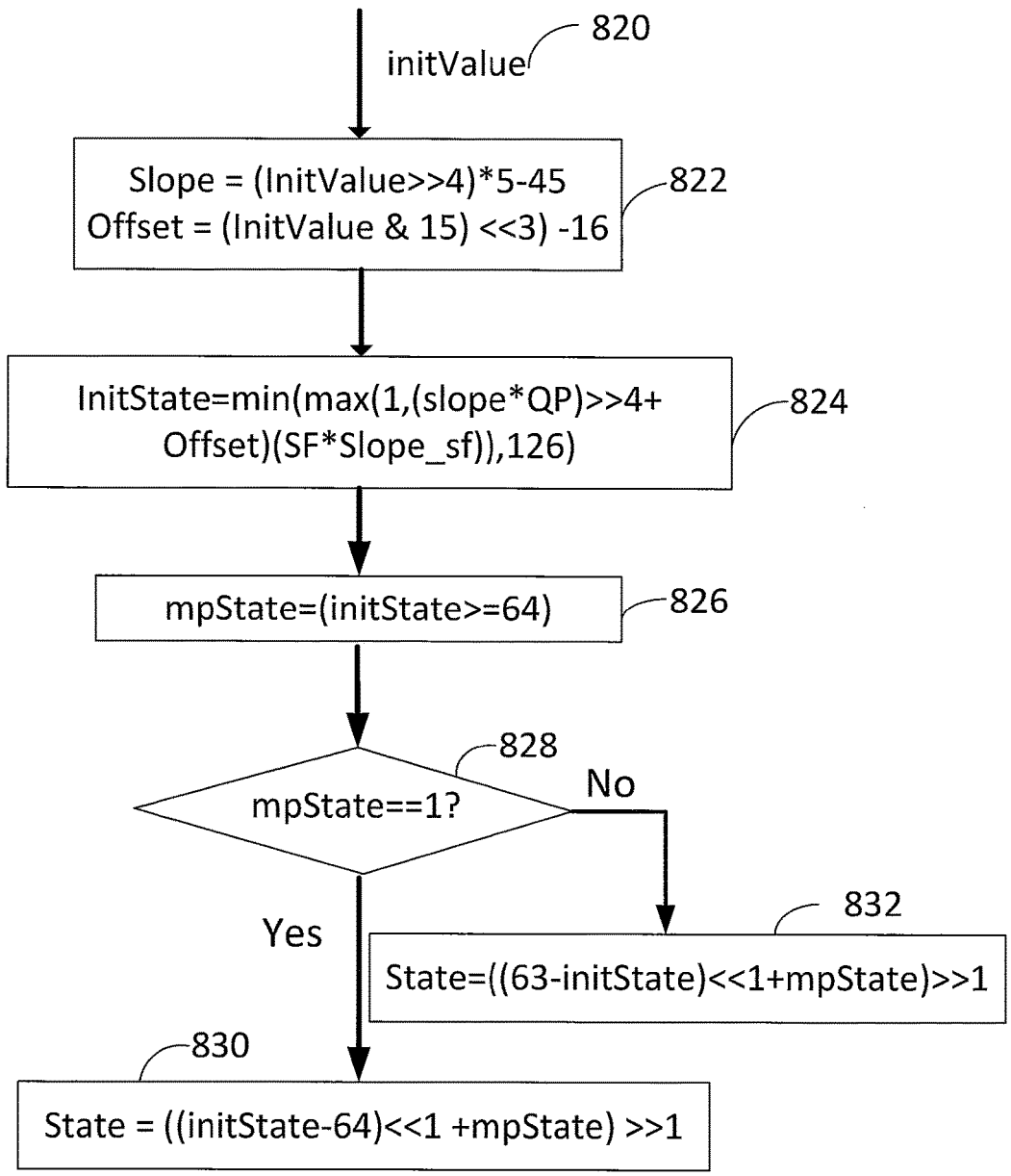
FIG. 29 illustrates a modified probability determination.

Referring to FIG. 29, the determination of the MPS and LPS initial probability may be based upon an initialization value ("initValue") 820 such as from a table. The initValue 800 is used to determine a slope and an offset 822. The slope generally reflects how the probability is changing based on quantization parameter and the offset generally reflects the level of probability. An initialization state ("initState") 824 is used to represent the probability information of the MPS and LPS probability, which may be based upon a corresponding quantization parameter ("QP"), the slope, the offset, a scaling factor ("SF"), and a Slope_sf, where the Slope_sf represents the probability variation factor based on each context. The maximum probability symbol ("mpState") 826 determines the most probable symbol based upon the initState 824. If mpState 826 is greater than or equal to 64 then MPS=1, and if mpState 826 is less than 64 then MPS=0. If mpState is equal to 1 828 then the probability state 830 is selected. Alternatively, if mpState is equal to 0 828 then the probability state 832 is selected. The different state references corresponding portions of the same or different tables for suitable probability values, such as the LPS probabilities.

The initValue may be signaled in the bitstream in any suitable manner. For example, the number of the "initValue" table to be used in the decoder may be signaled. In this manner, the initValue tables are already stored in the decoder and results in a reduction of data being included in the bitstream. The "initValue" table(s) for some or all of the contexts may be stored in one or more tables, as desired. For example, all or a selected set of initValues may be transmitted from the encoder to the decoder. For example, the initValue may be inferred based upon available information, such as, the base layer slice type, picture order count, temporal Id, offset quantization parameter, difference quantization parameter, etc. For example, a CABAC initialization flag which indicates which table to use the CABAC technique may further be used to represent the initialization value. Referring to FIG. 31, for example, the initValue may be explicitly transmitted with each picture and/or slice. For example, at the decoder, for the enhancement layer, the same initValue tables in base layer may be reused. For example, at the decoder, for the base layer, the context model is initialized according to the method in HEVC, such as described below. Referring to FIG. 32, at the decoder, for the enhancement layer, each context model corresponding to an I_SLICE may be initialized using the same table as used for an I_SLICE in the base layer. At the decoder, for the enhancement layer, each P slice uses either a first table or a second table to initialize the context. The first table may be selected if a flag in the slice header (or other normative part of the bit-stream) is equal to 0. The second table is selected if the flag is equal to 1. At the decoder, for the enhancement layer, each B slice may use either a first table or second table to initialize the context based on a flag in the slice header. For example, at the decoder, for the enhancement layer, additional initValue tables may be used as illustrated. In this case, a second flag in the picture parameter set (or other normative part of the bit-stream) may be used to indicate the additional initValue table.

In some embodiments, a forward predicted B-slice or a backwards predicted B-slice (and/or picture) may be initialized in a manner different from a bi-directional predicted B-slice (and/or picture), and in a manner dependent on an initialization flag. In some embodiments, a forward predicted B-slice (and/or picture) may be initialized in a manner different from a backwards predicted B-slice (and/or picture) and/or a bi-directional predicted B-slice (and/or picture), and in a manner, dependent on an initialization flag. In some embodiments, an initialization technique for P-slices (and/or picture) may be applied to forward-predicted B-slices (and/or picture), and the in a manner dependent on an initialization flag. In some embodiments, an initialization technique for P-slices (and/or pictures) may be applied to B-slices (and/or pictures) and an initialization technique for B-slices (and/or pictures) may be applied to P-slices (and/or pictures), and in a manner dependent on an initialization flag. This technique may be used for the base layer and/or the enhancement layer, where both layers use the same and/or different initialization tables for the context model.

Figure 33:
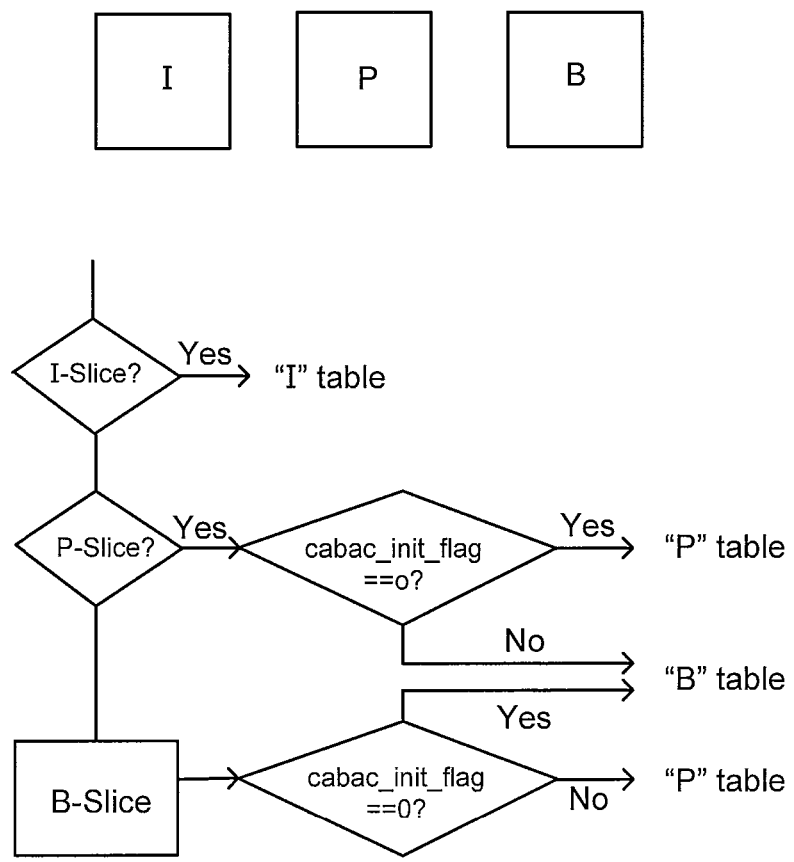
FIG. 33 illustrates an initValue table selection technique for a base layer.

Referring to FIG. 33, one exemplary technique is illustrated for the selection of an initialization table, preferably for the base layer. Preferably, there is one or more initValue tables for an I slice, a P slice, and a B slice. If the received slice is an I slice, then the technique should use the I initValue table. If the received slice is not an I slice and is a P slice, then if the cabac_init_flag is zero, then the technique should use the P initValue table. If the received slice is not an I slice and is a P slice, then if the cabac_init_flag is 1, then the technique should use the B initValue table. If the received slice is not an I slice and is not a P slice then the received slice is a B slice. If the cabac_init_flag is zero when the received slice is a B slice then the technique should use the B initValue table. If the cabac_init_flag is one when the received slice is a B slice then the technique should use the P initValue table.

Figure 34:
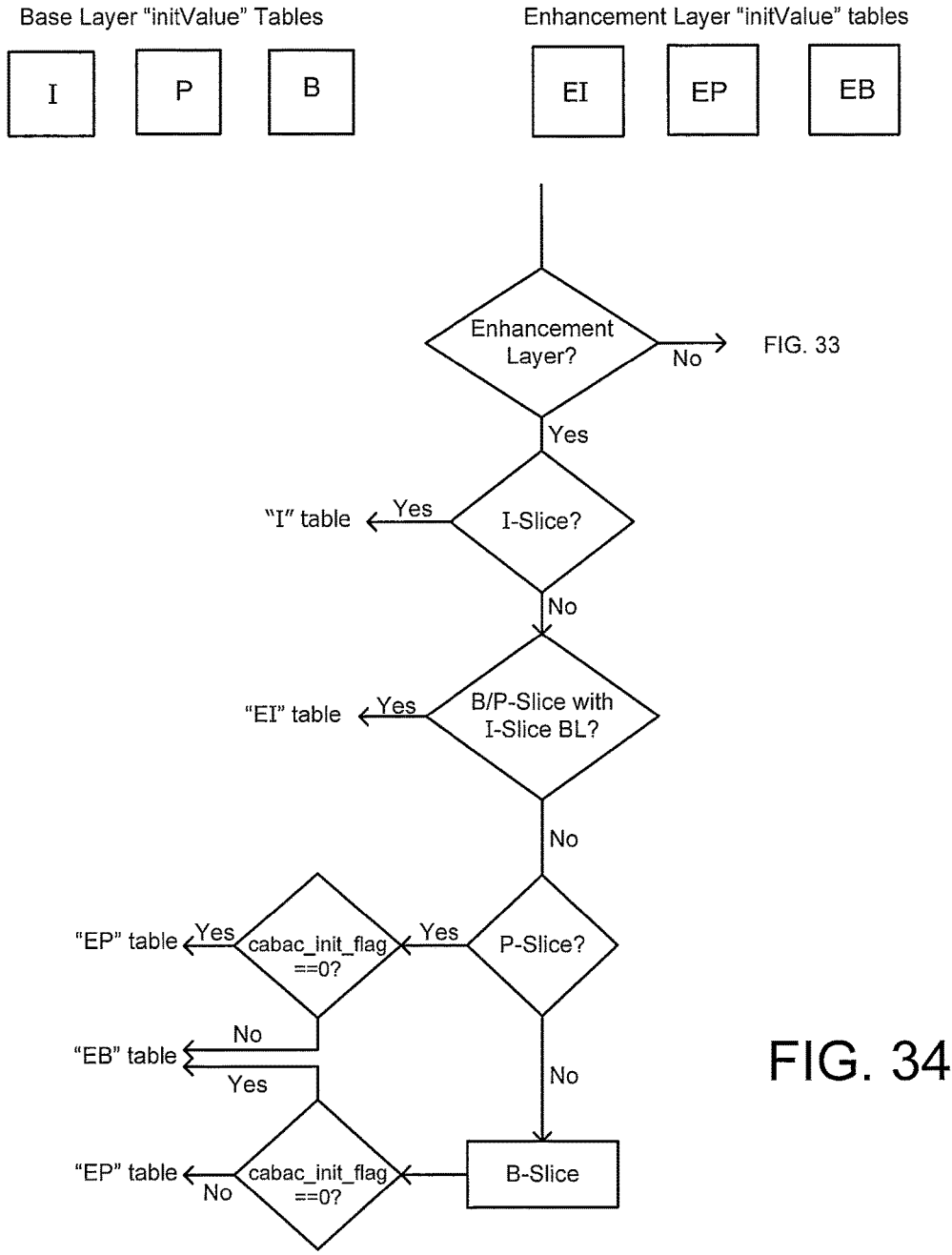
FIG. 34 illustrates an initValue table selection technique for an enhancement layer.

Referring to FIG. 34, one exemplary technique is illustrated for the selection of an initialization table preferably for the base layer and the enhancement layer. Preferably, there is one or more initValue tables for an I slice of the base layer, a P slice of the base layer, a B slice of the base layer, an I slice of the enhancement layer ("EI"), a P slice of the enhancement layer ("EP"), and a B slice of the enhancement layer ("EB"). If the received slice is for the base layer, then the technique uses that which is illustrated in FIG. 33. If the received enhancement slice (EI) is an I slice, then the technique should use the EI initValue table. If the received slice is not an I slice and is a P slice or a B slice where the corresponding base layer slice is an I slice, then the technique should use the EI initValue table. If the received slice is not an I slice and the corresponding base slice is not an I slice, then if the received slice is a P slice the EP Table or the EB table is selected based upon the cabac_init_flag. If the received slice is not an I slice and the corresponding base slice is not an I slice, then if the received slice is a B slice the EP Table or the EB table is selected based upon the cabac_init_flag.

Figure 35:
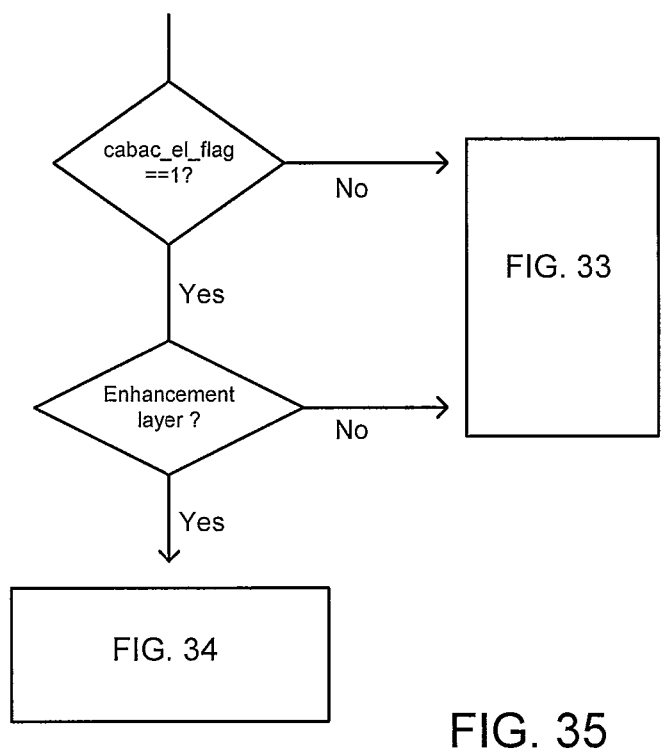
FIG. 35 illustrates a selection mechanism as to whether to use the techniques illustrated in FIG. 33 and FIG. 34.

The cabac_el_flag is defined in a sequence parameter set to indicate whether or not the modified table selection technique of FIG. 33 and FIG. 34 is used. Referring to FIG. 35, if the cabac_el_flag is not 1, then the technique of FIG. 33 is used. If the cabac_el_flag is 1 and the slice is not for an enhancement layer, then the technique illustrated in FIG. 33 is used. If the cabac_el_flag is 1 and the slice is an enhancement layer, then the technique illustrated in FIG. 34 is used.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A processor based method for decoding a video bitstream comprising:
    (a) receiving a base bitstream including a plurality of base frames for said video bitstream;
    (b) receiving at least one enhancement layer including a plurality of enhancement frames for said video bitstream, where said plurality of enhancement frames include a hierarchical coding structure;
    (c) initializing an initial value for a context modeler by selecting one of a plurality of predetermined initial values available to said decoder, selection using said hierarchical coding structure, and selection using at least one of a deltaQP characteristic, a picture order count, and a temporalID characteristic where said temporalID characteristic is permitted to be associated with more than one frame in a single enhancement layer;
    (d) based upon said initial value and said initializing, decoding said enhancement bitstream.

2. The method of claim 1 where said plurality of predetermined initial values available to said decoder are assembled, for selection by the decoder, independently of prior decoding of said base layer at the time of selection, and independently of prior decoding of said enhancement layer at the time of selection.

3. The method of claim 2 wherein a plurality of said enhancement layers includes an ordering defined between said enhancement layers.

4. The method of claim 3 wherein said decoding uses a binary arithmetic decoder.

5. The method of claim 4 wherein said initial value is probability estimation.

6. The method of claim 5 wherein said hierarchical structures includes at least one of intra-coded frames and inter-coded frames.

7. The method of claim 6 wherein a picture order count is used as a basis for selecting said initial value.

8. The method of claim 6 wherein a quantization parameter is used as a basis for selecting said initial value.

9. The method of claim 6 wherein a slice type classification is used as a basis for selecting said initial value.

10. The method of claim 9 wherein said slice type classification is for corresponding frames of said base frames for said video bitstream.

11. The method of claim 6 wherein a quantization difference between a quantization parameter of said base frames and a quantization parameter of said enhancement frames is used as a basis for selecting said initial value.

12. The method of claim 11 wherein said quantization difference is scaled by a scaling factor.

13. The method of claim 1 wherein said temporalID characteristic is permitted to be associated with more than one frame in a single enhancement layer in a sequence of frames beginning with an independently coded frame and ending prior to a next sequential independently coded frame.

14. The method of claim 1 wherein said temporalID identifies one of a plurality of available frame rates.

15. A processor based method for decoding a video bitstream comprising:
 (a) receiving a base bitstream including a plurality of base frames for said video bitstream;
 (b) receiving at least one enhancement layer including a plurality of enhancement frames for said video bitstream, where said plurality of enhancement frames include a hierarchical coding structure;
 (c) initializing an initial value for a context modeler by selecting one of a plurality of predetermined initial values available to said decoder, selection using said hierarchical coding structure, and selection using a difference between a quantization parameter of said base frames and a quantization parameter of said enhancement frames;
 (d) based upon said initial value and said initializing, decoding said enhancement bitstream.

16. The method of claim 15 where said initial value is a probability estimation.

17. The method of claim 15 where said difference is scaled by a scaling factor.

18. The method of claim 15 where said initial value is signaled in a slice header.

19. A processor based method for decoding a video bitstream comprising:
 (a) receiving a base bitstream including a plurality of base frames for said video bitstream;
 (b) receiving at least one enhancement layer including a plurality of enhancement frames for said video bitstream, where said plurality of enhancement frames include a plurality of frame types comprising I, P, and B frames;
 (c) initializing an initial value for a context modeler by selecting one of a plurality of predetermined initial values available to said decoder, selection using a hierarchical arrangement of different sets of said I,P, and B frames; and
 (d) based upon said initial value and said initializing, decoding said enhancement bitstream.

\* \* \* \* \*